US009021541B2

(12) United States Patent
Regis et al.

(10) Patent No.: US 9,021,541 B2
(45) Date of Patent: Apr. 28, 2015

(54) STREAMING DIGITAL VIDEO BETWEEN VIDEO DEVICES USING A CABLE TELEVISION SYSTEM

(75) Inventors: Natalie Regis, Chicago, IL (US); Mark Tom, Sunnyvale, CA (US); Andrey Marsavin, San Jose, CA (US); Lena Y. Pavlovskaia, Cupertino, CA (US)

(73) Assignee: ActiveVideo Networks, Inc., San Jose, CA (US)

( * ) Notice: Subject to any disclaimer, the term of this patent is extended or adjusted under 35 U.S.C. 154(b) by 21 days.

(21) Appl. No.: 13/273,803

(22) Filed: Oct. 14, 2011

(65) Prior Publication Data

US 2012/0204217 A1    Aug. 9, 2012

Related U.S. Application Data

(60) Provisional application No. 61/393,262, filed on Oct. 14, 2010.

(51) Int. Cl.
*H04N 7/173* (2011.01)
*H04N 21/4788* (2011.01)
*H04H 20/78* (2008.01)
(Continued)

(52) U.S. Cl.
CPC ........... *H04N 21/4788* (2013.01); *H04H 20/78* (2013.01); *H04N 21/6118* (2013.01); *H04N 21/6168* (2013.01); *H04N 21/2221* (2013.01); *H04N 21/2665* (2013.01)

(58) Field of Classification Search
CPC .......... H04N 21/2221; H04N 21/2665; H04N 21/4788; H04N 21/6118; H04N 21/6168; H04H 20/78

USPC ......... 725/32, 34, 36, 62, 103, 118, 135, 143, 725/89, 134, 42, 142, 116; 348/14.04, 348/14.08
See application file for complete search history.

(56) References Cited

U.S. PATENT DOCUMENTS 3,889,050 A    6/1975   Thompson
3,934,079 A    1/1976   Barnhart
(Continued)

FOREIGN PATENT DOCUMENTS

AT         191599 T     4/2000
AT         198969 T     2/2001
(Continued)

OTHER PUBLICATIONS

Activevideo Networks Inc., International Preliminary Report on Patentability, PCT/US2011/056355, Apr. 16, 2013, 4 pgs.
(Continued)

*Primary Examiner* — Nasser Goodarzi
*Assistant Examiner* — Michael B Pierorazio
(74) *Attorney, Agent, or Firm* — Morgan, Lewis & Bockius LLP

(57) ABSTRACT

Systems and methods are presented that permit an individual to share digital video between video devices using a cable television system. A first video device streams digital video to a cable headend, which transcodes it and stitches it with other video content, such as a menuing system. The headend then transmits the digital video to a second video device, such as a set top box, for display. The data stream may be controlled using a standard set top box remote control, and the system may be used without purchasing additional hardware or software, or configuring a wireless local area network.

20 Claims, 5 Drawing Sheets

(51) Int. Cl.
*H04N 21/61* (2011.01)
*H04N 21/222* (2011.01)
*H04N 21/2665* (2011.01)

(56) References Cited

U.S. PATENT DOCUMENTS

| | | | |
|---|---|---|---|
| 3,997,718 A | 12/1976 | Ricketts et al. | |
| 4,002,843 A | 1/1977 | Rackman | |
| 4,032,972 A | 6/1977 | Saylor | |
| 4,077,006 A | 2/1978 | Nicholson | |
| 4,081,831 A | 3/1978 | Tang et al. | |
| 4,107,734 A * | 8/1978 | Percy et al. | 725/14 |
| 4,107,735 A * | 8/1978 | Frohbach | 725/14 |
| 4,145,720 A | 3/1979 | Weintraub et al. | |
| 4,168,400 A | 9/1979 | de Couasnon et al. | |
| 4,186,438 A | 1/1980 | Benson et al. | |
| 4,222,068 A | 9/1980 | Thompson | |
| 4,245,245 A | 1/1981 | Matsumoto et al. | |
| 4,247,106 A | 1/1981 | Jeffers et al. | |
| 4,253,114 A | 2/1981 | Tang et al. | |
| 4,264,924 A | 4/1981 | Freeman | |
| 4,264,925 A | 4/1981 | Freeman et al. | |
| 4,290,142 A | 9/1981 | Schnee et al. | |
| 4,302,771 A | 11/1981 | Gargini | |
| 4,308,554 A * | 12/1981 | Percy et al. | 725/14 |
| 4,350,980 A | 9/1982 | Ward | |
| 4,367,557 A | 1/1983 | Stern et al. | |
| 4,395,780 A | 7/1983 | Gohm et al. | |
| 4,408,225 A | 10/1983 | Ensinger et al. | |
| 4,450,477 A | 5/1984 | Lovett | |
| 4,454,538 A | 6/1984 | Toriumi | |
| 4,466,017 A | 8/1984 | Banker | |
| 4,471,380 A | 9/1984 | Mobley | |
| 4,475,123 A | 10/1984 | Dumbauld et al. | |
| 4,484,217 A | 11/1984 | Block et al. | |
| 4,491,983 A | 1/1985 | Pinnow et al. | |
| 4,506,387 A | 3/1985 | Walter | |
| 4,507,680 A | 3/1985 | Freeman | |
| 4,509,073 A | 4/1985 | Baran et al. | |
| 4,523,228 A | 6/1985 | Banker | |
| 4,533,948 A | 8/1985 | McNamara et al. | |
| 4,536,791 A | 8/1985 | Campbell et al. | |
| 4,538,174 A | 8/1985 | Gargini et al. | |
| 4,538,176 A | 8/1985 | Nakajima et al. | |
| 4,553,161 A | 11/1985 | Citta | |
| 4,554,581 A | 11/1985 | Tentler et al. | |
| 4,555,561 A * | 11/1985 | Sugimori et al. | 528/26 |
| 4,562,465 A | 12/1985 | Glaab | |
| 4,567,517 A | 1/1986 | Mobley | |
| 4,573,072 A | 2/1986 | Freeman | |
| 4,591,906 A | 5/1986 | Morales-Garza et al. | |
| 4,602,279 A | 7/1986 | Freeman | |
| 4,614,970 A | 9/1986 | Clupper et al. | |
| 4,616,263 A | 10/1986 | Eichelberger | |
| 4,625,235 A | 11/1986 | Watson | |
| 4,627,105 A | 12/1986 | Ohashi et al. | |
| 4,633,462 A | 12/1986 | Stifle et al. | |
| 4,670,904 A | 6/1987 | Rumreich | |
| 4,682,360 A | 7/1987 | Frederiksen | |
| 4,695,880 A | 9/1987 | Johnson et al. | |
| 4,706,121 A | 11/1987 | Young | |
| 4,706,285 A | 11/1987 | Rumreich | |
| 4,709,418 A | 11/1987 | Fox et al. | |
| 4,710,971 A | 12/1987 | Nozaki et al. | |
| 4,718,086 A | 1/1988 | Rumreich et al. | |
| 4,732,764 A | 3/1988 | Hemingway et al. | |
| 4,734,764 A | 3/1988 | Pocock et al. | |
| 4,748,689 A | 5/1988 | Mohr | |
| 4,749,992 A | 6/1988 | Fitzemeyer et al. | |
| 4,750,036 A | 6/1988 | Martinez | |
| 4,754,426 A | 6/1988 | Rast et al. | |
| 4,760,442 A | 7/1988 | O'Connell et al. | |
| 4,763,317 A | 8/1988 | Lehman et al. | |
| 4,769,833 A | 9/1988 | Farleigh et al. | |
| 4,769,838 A | 9/1988 | Hasegawa | |
| 4,789,863 A | 12/1988 | Bush | |
| 4,792,849 A | 12/1988 | McCalley et al. | |
| 4,801,190 A | 1/1989 | Imoto | |
| 4,805,134 A | 2/1989 | Calo et al. | |
| 4,807,031 A | 2/1989 | Broughton et al. | |
| 4,816,905 A | 3/1989 | Tweedy et al. | |
| 4,821,102 A | 4/1989 | Ichikawa et al. | |
| 4,823,386 A | 4/1989 | Dumbauld et al. | |
| 4,827,253 A | 5/1989 | Maltz | |
| 4,827,511 A | 5/1989 | Masuko | |
| 4,829,372 A | 5/1989 | McCalley et al. | |
| 4,829,558 A | 5/1989 | Welsh | |
| 4,847,698 A | 7/1989 | Freeman | |
| 4,847,699 A | 7/1989 | Freeman | |
| 4,847,700 A | 7/1989 | Freeman | |
| 4,848,698 A | 7/1989 | Newell et al. | |
| 4,860,379 A | 8/1989 | Schoeneberger et al. | |
| 4,864,613 A | 9/1989 | Van Cleave | |
| 4,876,592 A | 10/1989 | Von Kohorn | |
| 4,889,369 A | 12/1989 | Albrecht | |
| 4,890,320 A | 12/1989 | Monslow et al. | |
| 4,891,694 A | 1/1990 | Way | |
| 4,901,367 A | 2/1990 | Nicholson | |
| 4,903,126 A | 2/1990 | Kassatly | |
| 4,905,094 A | 2/1990 | Pocock et al. | |
| 4,912,760 A | 3/1990 | West, Jr. et al. | |
| 4,918,516 A | 4/1990 | Freeman | |
| 4,920,566 A | 4/1990 | Robbins et al. | |
| 4,922,532 A | 5/1990 | Farmer et al. | |
| 4,924,303 A | 5/1990 | Brandon et al. | |
| 4,924,498 A | 5/1990 | Farmer et al. | |
| 4,937,821 A | 6/1990 | Boulton | |
| 4,941,040 A | 7/1990 | Pocock et al. | |
| 4,947,244 A | 8/1990 | Fenwick et al. | |
| 4,961,211 A | 10/1990 | Tsugane et al. | |
| 4,963,995 A | 10/1990 | Lang | |
| 4,975,771 A | 12/1990 | Kassatly | |
| 4,989,245 A | 1/1991 | Bennett | |
| 4,994,909 A | 2/1991 | Graves et al. | |
| 4,995,078 A | 2/1991 | Monslow et al. | |
| 5,003,384 A * | 3/1991 | Durden et al. | 725/104 |
| 5,008,934 A | 4/1991 | Endoh | |
| 5,014,125 A | 5/1991 | Pocock et al. | |
| 5,027,400 A | 6/1991 | Baji et al. | |
| 5,051,720 A | 9/1991 | Kittirutsunetorn | |
| 5,051,822 A | 9/1991 | Rhoades | |
| 5,057,917 A | 10/1991 | Shalkauser et al. | |
| 5,058,160 A | 10/1991 | Banker et al. | |
| 5,060,262 A | 10/1991 | Bevins, Jr et al. | |
| 5,077,607 A | 12/1991 | Johnson et al. | |
| 5,083,800 A | 1/1992 | Lockton | |
| 5,088,111 A | 2/1992 | McNamara et al. | |
| 5,093,718 A | 3/1992 | Hoarty et al. | |
| 5,109,414 A | 4/1992 | Harvey et al. | |
| 5,113,496 A | 5/1992 | McCalley et al. | |
| 5,119,188 A | 6/1992 | McCalley et al. | |
| 5,130,792 A | 7/1992 | Tindell et al. | |
| 5,132,992 A | 7/1992 | Yurt et al. | |
| 5,133,009 A | 7/1992 | Rumreich | |
| 5,133,079 A | 7/1992 | Ballantyne et al. | |
| 5,136,411 A | 8/1992 | Paik et al. | |
| 5,142,575 A | 8/1992 | Farmer et al. | |
| 5,144,448 A | 9/1992 | Hornbaker, III et al. | |
| 5,155,591 A | 10/1992 | Wachob | |
| 5,172,413 A | 12/1992 | Bradley et al. | |
| 5,191,410 A | 3/1993 | McCalley et al. | |
| 5,195,092 A | 3/1993 | Wilson et al. | |
| 5,208,665 A | 5/1993 | McCalley et al. | |
| 5,220,420 A | 6/1993 | Hoarty et al. | |
| 5,230,019 A | 7/1993 | Yanagimichi et al. | |
| 5,231,494 A | 7/1993 | Wachob | |
| 5,236,199 A | 8/1993 | Thompson, Jr. | |
| 5,247,347 A | 9/1993 | Litteral et al. | |
| 5,253,341 A | 10/1993 | Rozmanith et al. | |
| 5,262,854 A | 11/1993 | Ng | |
| 5,262,860 A | 11/1993 | Fitzpatrick et al. | |
| 5,303,388 A | 4/1994 | Kreitman et al. | |
| 5,319,455 A | 6/1994 | Hoarty et al. | |
| 5,319,707 A | 6/1994 | Wasilewski et al. | |

(56) References Cited

U.S. PATENT DOCUMENTS

| | | | |
|---|---|---|---|
| 5,321,440 A | 6/1994 | Yanagihara et al. | |
| 5,321,514 A | 6/1994 | Martinez | |
| 5,351,129 A | 9/1994 | Lai | |
| 5,355,162 A | 10/1994 | Yazolino et al. | |
| 5,359,601 A | 10/1994 | Wasilewski et al. | |
| 5,361,091 A | 11/1994 | Hoarty et al. | |
| 5,371,532 A | 12/1994 | Gelman et al. | |
| 5,404,393 A | 4/1995 | Remillard | |
| 5,408,274 A | 4/1995 | Chang et al. | |
| 5,410,343 A | 4/1995 | Coddington et al. | |
| 5,410,344 A | 4/1995 | Graves et al. | |
| 5,412,415 A | 5/1995 | Cook et al. | |
| 5,412,720 A | 5/1995 | Hoarty | |
| 5,418,559 A | 5/1995 | Blahut | |
| 5,422,674 A | 6/1995 | Hooper et al. | |
| 5,422,887 A | 6/1995 | Diepstraten et al. | |
| 5,442,389 A | 8/1995 | Blahut et al. | |
| 5,442,390 A | 8/1995 | Hooper et al. | |
| 5,442,700 A | 8/1995 | Snell et al. | |
| 5,446,490 A | 8/1995 | Blahut et al. | |
| 5,469,283 A | 11/1995 | Vinel et al. | |
| 5,469,431 A | 11/1995 | Wendorf et al. | |
| 5,471,263 A | 11/1995 | Odaka | |
| 5,481,542 A | 1/1996 | Logston et al. | |
| 5,485,197 A | 1/1996 | Hoarty | |
| 5,487,066 A | 1/1996 | McNamara et al. | |
| 5,493,638 A | 2/1996 | Hooper et al. | |
| 5,495,283 A | 2/1996 | Cowe | |
| 5,495,295 A | 2/1996 | Long | |
| 5,497,187 A | 3/1996 | Banker et al. | |
| 5,517,250 A | 5/1996 | Hoogenboom et al. | |
| 5,526,034 A | 6/1996 | Hoarty et al. | |
| 5,528,281 A | 6/1996 | Grady et al. | |
| 5,537,397 A * | 7/1996 | Abramson | 370/441 |
| 5,537,404 A | 7/1996 | Bentley et al. | |
| 5,539,449 A | 7/1996 | Blahut et al. | |
| RE35,314 E | 8/1996 | Logg | |
| 5,548,340 A | 8/1996 | Bertram | |
| 5,550,578 A | 8/1996 | Hoarty et al. | |
| 5,557,316 A | 9/1996 | Hoarty et al. | |
| 5,559,549 A | 9/1996 | Hendricks et al. | |
| 5,561,708 A | 10/1996 | Remillard | |
| 5,570,126 A | 10/1996 | Blahut et al. | |
| 5,570,363 A | 10/1996 | Holm | |
| 5,579,143 A | 11/1996 | Huber | |
| 5,581,653 A | 12/1996 | Todd | |
| 5,583,927 A | 12/1996 | Ely et al. | |
| 5,587,734 A | 12/1996 | Lauder et al. | |
| 5,589,885 A | 12/1996 | Ooi | |
| 5,592,470 A | 1/1997 | Rudrapatna et al. | |
| 5,594,507 A | 1/1997 | Hoarty | |
| 5,594,723 A | 1/1997 | Tibi | |
| 5,594,938 A * | 1/1997 | Engel | 725/139 |
| 5,596,693 A | 1/1997 | Needle et al. | |
| 5,600,364 A | 2/1997 | Hendricks et al. | |
| 5,600,573 A | 2/1997 | Hendricks et al. | |
| 5,608,446 A | 3/1997 | Carr et al. | |
| 5,617,145 A | 4/1997 | Huang et al. | |
| 5,621,464 A | 4/1997 | Teo et al. | |
| 5,625,404 A | 4/1997 | Grady et al. | |
| 5,630,757 A | 5/1997 | Gagin et al. | |
| 5,631,693 A | 5/1997 | Wunderlich et al. | |
| 5,631,846 A | 5/1997 | Szurkowski | |
| 5,632,003 A | 5/1997 | Davidson et al. | |
| 5,649,283 A | 7/1997 | Galler et al. | |
| 5,668,592 A | 9/1997 | Spaulding, II | |
| 5,668,599 A | 9/1997 | Cheney et al. | |
| 5,708,767 A | 1/1998 | Yeo et al. | |
| 5,710,815 A | 1/1998 | Ming et al. | |
| 5,712,906 A | 1/1998 | Grady et al. | |
| 5,740,307 A | 4/1998 | Lane | |
| 5,742,289 A | 4/1998 | Naylor et al. | |
| 5,748,234 A | 5/1998 | Lippincott | |
| 5,754,941 A | 5/1998 | Sharpe et al. | |
| 5,786,527 A | 7/1998 | Tarte | |
| 5,790,174 A | 8/1998 | Richard, III et al. | |
| 5,802,283 A | 9/1998 | Grady et al. | |
| 5,812,665 A | 9/1998 | Hoarty et al. | |
| 5,812,786 A | 9/1998 | Seazholtz et al. | |
| 5,815,604 A | 9/1998 | Simons et al. | |
| 5,818,438 A | 10/1998 | Howe et al. | |
| 5,821,945 A | 10/1998 | Yeo et al. | |
| 5,822,537 A | 10/1998 | Katseff et al. | |
| 5,828,371 A | 10/1998 | Cline et al. | |
| 5,844,594 A | 12/1998 | Ferguson | |
| 5,845,083 A | 12/1998 | Hamadani et al. | |
| 5,862,325 A | 1/1999 | Reed et al. | |
| 5,864,820 A | 1/1999 | Case | |
| 5,867,208 A | 2/1999 | McLaren | |
| 5,883,661 A | 3/1999 | Hoarty | |
| 5,903,727 A | 5/1999 | Nielsen | |
| 5,903,816 A | 5/1999 | Broadwin et al. | |
| 5,905,522 A | 5/1999 | Lawler | |
| 5,907,681 A | 5/1999 | Bates et al. | |
| 5,917,822 A | 6/1999 | Lyles et al. | |
| 5,946,352 A | 8/1999 | Rowlands et al. | |
| 5,952,943 A | 9/1999 | Walsh et al. | |
| 5,959,690 A | 9/1999 | Toebes et al. | |
| 5,961,603 A | 10/1999 | Kunkel et al. | |
| 5,963,203 A | 10/1999 | Goldberg et al. | |
| 5,966,163 A | 10/1999 | Lin et al. | |
| 5,978,756 A | 11/1999 | Walker et al. | |
| 5,982,445 A | 11/1999 | Eyer et al. | |
| 5,990,862 A | 11/1999 | Lewis | |
| 5,995,146 A | 11/1999 | Rasmussen | |
| 5,995,488 A | 11/1999 | Kalkunte et al. | |
| 5,999,970 A | 12/1999 | Krisbergh et al. | |
| 6,014,416 A | 1/2000 | Shin et al. | |
| 6,021,386 A | 2/2000 | Davis et al. | |
| 6,031,989 A | 2/2000 | Cordell | |
| 6,034,678 A | 3/2000 | Hoarty et al. | |
| 6,049,539 A | 4/2000 | Lee et al. | |
| 6,049,831 A | 4/2000 | Gardell et al. | |
| 6,052,555 A | 4/2000 | Ferguson | |
| 6,055,314 A * | 4/2000 | Spies et al. | 380/228 |
| 6,055,315 A | 4/2000 | Doyle et al. | |
| 6,064,377 A | 5/2000 | Hoarty et al. | |
| 6,078,328 A | 6/2000 | Schumann et al. | |
| 6,084,908 A | 7/2000 | Chiang et al. | |
| 6,100,883 A | 8/2000 | Hoarty | |
| 6,108,625 A | 8/2000 | Kim | |
| 6,131,182 A | 10/2000 | Beakes et al. | |
| 6,141,645 A | 10/2000 | Chi-Min et al. | |
| 6,141,693 A | 10/2000 | Perlman et al. | |
| 6,144,698 A | 11/2000 | Poon et al. | |
| 6,167,084 A | 12/2000 | Wang et al. | |
| 6,169,573 B1 | 1/2001 | Sampath-Kumar et al. | |
| 6,177,931 B1 | 1/2001 | Alexander et al. | |
| 6,182,072 B1 | 1/2001 | Leak et al. | |
| 6,184,878 B1 | 2/2001 | Alonso et al. | |
| 6,192,081 B1 | 2/2001 | Chiang et al. | |
| 6,198,822 B1 | 3/2001 | Doyle et al. | |
| 6,205,582 B1 | 3/2001 | Hoarty | |
| 6,226,041 B1 | 5/2001 | Florencio et al. | |
| 6,236,730 B1 | 5/2001 | Cowieson et al. | |
| 6,243,418 B1 | 6/2001 | Kim | |
| 6,253,238 B1 | 6/2001 | Lauder et al. | |
| 6,256,047 B1 | 7/2001 | Isobe et al. | |
| 6,259,826 B1 | 7/2001 | Pollard et al. | |
| 6,266,369 B1 | 7/2001 | Wang et al. | |
| 6,266,684 B1 | 7/2001 | Kraus et al. | |
| 6,275,496 B1 | 8/2001 | Burns et al. | |
| 6,292,194 B1 | 9/2001 | Powell, III | |
| 6,305,020 B1 | 10/2001 | Hoarty et al. | |
| 6,317,151 B1 | 11/2001 | Ohsuga et al. | |
| 6,317,885 B1 | 11/2001 | Fries | |
| 6,349,284 B1 | 2/2002 | Park et al. | |
| 6,385,771 B1 | 5/2002 | Gordon | |
| 6,386,980 B1 | 5/2002 | Nishino et al. | |
| 6,389,075 B2 | 5/2002 | Wang et al. | |
| 6,389,218 B2 | 5/2002 | Gordon et al. | |
| 6,415,031 B1 | 7/2002 | Colligan et al. | |
| 6,415,437 B1 | 7/2002 | Ludvig et al. | |
| 6,438,140 B1 | 8/2002 | Jungers et al. | |

(56) References Cited

U.S. PATENT DOCUMENTS

| | | | |
|---|---|---|---|
| 6,446,037 B1 | 9/2002 | Fielder et al. |
| 6,459,427 B1 | 10/2002 | Mao et al. |
| 6,477,182 B2 | 11/2002 | Calderone |
| 6,481,012 B1 | 11/2002 | Gordon et al. |
| 6,512,793 B1 | 1/2003 | Maeda |
| 6,525,746 B1 | 2/2003 | Lau et al. |
| 6,536,043 B1 | 3/2003 | Guedalia |
| 6,557,041 B2 | 4/2003 | Mallart |
| 6,560,496 B1 | 5/2003 | Michener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,621,870 B1 | 9/2003 | Gordon et al. |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. |
| 6,657,647 B1 | 12/2003 | Bright |
| 6,675,385 B1 | 1/2004 | Wang |
| 6,675,387 B1 | 1/2004 | Boucher |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 * | 4/2004 | Wasilewski ............ 725/60 |
| 6,727,929 B1 | 4/2004 | Bates et al. |
| 6,732,370 B1 | 5/2004 | Gordon et al. |
| 6,747,991 B1 | 6/2004 | Hemy et al. |
| 6,754,271 B1 | 6/2004 | Gordon et al. |
| 6,754,905 B2 | 6/2004 | Gordon et al. |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,030,890 B1 | 4/2006 | Jouet et al. |
| 7,050,113 B2 | 5/2006 | Campisano et al. |
| 7,089,577 B1 * | 8/2006 | Rakib et al. ............ 725/87 |
| 7,095,402 B2 * | 8/2006 | Kunii et al. ............ 345/169 |
| 7,114,167 B2 * | 9/2006 | Slemmer et al. ............ 725/28 |
| 7,146,615 B1 | 12/2006 | Hervet et al. |
| 7,158,676 B1 | 1/2007 | Rainsford |
| 7,200,836 B2 | 4/2007 | Brodersen et al. |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 * | 12/2007 | Baar et al. ............ 705/50 |
| 7,325,043 B1 * | 1/2008 | Rosenberg et al. ............ 709/219 |
| 7,346,111 B2 | 3/2008 | Winger et al. |
| 7,360,230 B1 | 4/2008 | Paz et al. |
| 7,412,423 B1 * | 8/2008 | Asano ............ 705/75 |
| 7,412,505 B2 * | 8/2008 | Slemmer et al. ............ 709/223 |
| 7,421,082 B2 * | 9/2008 | Kamiya et al. ............ 380/278 |
| 7,444,306 B2 * | 10/2008 | Varble ............ 705/52 |
| 7,444,418 B2 | 10/2008 | Chou et al. |
| 7,500,235 B2 * | 3/2009 | Maynard et al. ............ 717/172 |
| 7,508,941 B1 | 3/2009 | O'Toole, Jr. et al. |
| 7,512,577 B2 * | 3/2009 | Slemmer et al. ............ 706/47 |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 * | 2/2010 | Goode ............ 725/95 |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 | 7/2010 | Fukuda |
| 7,830,388 B1 | 11/2010 | Lu |
| 7,840,905 B1 | 11/2010 | Weber et al. |
| 7,936,819 B2 | 5/2011 | Craig et al. |
| 7,970,263 B1 | 6/2011 | Asch |
| 7,987,489 B2 * | 7/2011 | Krzyzanowski et al. ....... 725/80 |
| 8,027,353 B2 | 9/2011 | Damola et al. |
| 8,036,271 B2 | 10/2011 | Winger et al. |
| 8,046,798 B1 * | 10/2011 | Schlack et al. ............ 725/46 |
| 8,074,248 B2 | 12/2011 | Sigmon, Jr. et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 2001/0008845 A1 | 7/2001 | Kusuda et al. |
| 2001/0049301 A1 | 12/2001 | Masuda et al. |
| 2002/0007491 A1 * | 1/2002 | Schiller et al. ............ 725/87 |
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0056083 A1 | 5/2002 | Istvan |
| 2002/0056107 A1 * | 5/2002 | Schlack ............ 725/46 |
| 2002/0056136 A1 | 5/2002 | Wistendahl et al. |
| 2002/0059644 A1 | 5/2002 | Andrade et al. |
| 2002/0062484 A1 * | 5/2002 | De Lange et al. ............ 725/105 |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 * | 8/2002 | Alao et al. ............ 725/110 |
| 2002/0131511 A1 * | 9/2002 | Zenoni ............ 375/240.28 |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 * | 11/2002 | Plotnick et al. ............ 725/36 |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |

(56) References Cited

U.S. PATENT DOCUMENTS

| | | |
|---|---|---|
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1 | 4/2003 | Shen et al. |
| 2003/0076546 A1 | 4/2003 | Johnson et al. |
| 2003/0088328 A1 | 5/2003 | Nishio et al. |
| 2003/0088400 A1 | 5/2003 | Nishio et al. |
| 2003/0095790 A1 | 5/2003 | Joshi |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1* | 7/2003 | Chernock et al. ............ 725/105 |
| 2003/0131349 A1* | 7/2003 | Kuczynski-Brown ............ 725/6 |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0107443 A1* | 6/2004 | Clancy ............ 725/100 |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1* | 7/2004 | Krzyzanowski et al. ...... 709/250 |
| 2004/0136698 A1 | 7/2004 | Mock |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1* | 3/2005 | Maynard et al. ............ 717/170 |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0105608 A1 | 5/2005 | Coleman et al. |
| 2005/0114906 A1 | 5/2005 | Hoarty et al. |
| 2005/0132305 A1 | 6/2005 | Guichard et al. |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1* | 9/2005 | Black ............ 725/34 |
| 2005/0216940 A1* | 9/2005 | Black ............ 725/87 |
| 2005/0226426 A1 | 10/2005 | Oomen et al. |
| 2005/0273832 A1 | 12/2005 | Zigmond et al. |
| 2005/0283741 A1 | 12/2005 | Balabanovic et al. |
| 2006/0001737 A1* | 1/2006 | Dawson et al. ............ 348/14.08 |
| 2006/0020960 A1 | 1/2006 | Relan et al. |
| 2006/0020994 A1 | 1/2006 | Crane et al. |
| 2006/0031906 A1* | 2/2006 | Kaneda ............ 725/113 |
| 2006/0039481 A1 | 2/2006 | Shen et al. |
| 2006/0041910 A1* | 2/2006 | Hatanaka et al. ............ 725/58 |
| 2006/0088105 A1 | 4/2006 | Shen et al. |
| 2006/0095944 A1 | 5/2006 | Demircin et al. |
| 2006/0112338 A1 | 5/2006 | Joung et al. |
| 2006/0117340 A1 | 6/2006 | Pavlovskaia et al. |
| 2006/0143678 A1 | 6/2006 | Chou et al. |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1* | 11/2006 | Hoffman et al. ............ 725/111 |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig et al. |
| 2007/0025639 A1 | 2/2007 | Zhou et al. |
| 2007/0033528 A1 | 2/2007 | Merril et al. |
| 2007/0033631 A1 | 2/2007 | Gordon et al. |
| 2007/0074251 A1* | 3/2007 | Oguz et al. ............ 725/45 |
| 2007/0079325 A1 | 4/2007 | de Heer |
| 2007/0107016 A1* | 5/2007 | Angel et al. ............ 725/61 |
| 2007/0115941 A1* | 5/2007 | Patel et al. ............ 370/352 |
| 2007/0124282 A1 | 5/2007 | Wittkotter |
| 2007/0124795 A1* | 5/2007 | McKissick et al. ............ 725/135 |
| 2007/0130446 A1 | 6/2007 | Minakami |
| 2007/0130592 A1 | 6/2007 | Haeusel |
| 2007/0152984 A1 | 7/2007 | Ording et al. |
| 2007/0172061 A1 | 7/2007 | Pinder |
| 2007/0174790 A1 | 7/2007 | Jing et al. |
| 2007/0180047 A1 | 8/2007 | Dong et al. |
| 2007/0237232 A1 | 10/2007 | Chang et al. |
| 2007/0250900 A1* | 10/2007 | Marcuvitz ............ 725/141 |
| 2007/0300280 A1 | 12/2007 | Turner et al. |
| 2008/0052742 A1 | 2/2008 | Kopf et al. |
| 2008/0066135 A1 | 3/2008 | Brodersen et al. |
| 2008/0077871 A1* | 3/2008 | Baar et al. ............ 715/762 |
| 2008/0084503 A1 | 4/2008 | Kondo |
| 2008/0094368 A1 | 4/2008 | Ording et al. |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0141325 A1* | 6/2008 | Ludvig et al. ............ 725/116 |
| 2008/0148336 A1* | 6/2008 | Walter et al. ............ 725/137 |
| 2008/0154583 A1 | 6/2008 | Goto et al. |
| 2008/0163059 A1 | 7/2008 | Craner |
| 2008/0163286 A1* | 7/2008 | Rudolph et al. ............ 725/28 |
| 2008/0170619 A1 | 7/2008 | Landau |
| 2008/0170622 A1 | 7/2008 | Gordon et al. |
| 2008/0178243 A1* | 7/2008 | Dong et al. ............ 725/116 |
| 2008/0178249 A1 | 7/2008 | Gordon et al. |
| 2008/0189740 A1 | 8/2008 | Carpenter et al. |
| 2008/0195573 A1 | 8/2008 | Onoda et al. |
| 2008/0201731 A1* | 8/2008 | Howcroft ............ 725/13 |
| 2008/0201736 A1 | 8/2008 | Gordon et al. |
| 2008/0212942 A1 | 9/2008 | Gordon et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1 | 10/2008 | Summers |
| 2008/0253440 A1 | 10/2008 | Srinivasan et al. |
| 2008/0271080 A1 | 10/2008 | Gossweiler et al. |
| 2008/0307066 A1* | 12/2008 | Amidon et al. ............ 709/217 |
| 2008/0320392 A1* | 12/2008 | Cleron et al. ............ 715/709 |
| 2009/0003446 A1 | 1/2009 | Wu et al. |
| 2009/0003705 A1* | 1/2009 | Zou et al. ............ 382/187 |
| 2009/0007199 A1* | 1/2009 | La Joie ............ 725/95 |

(56) References Cited

U.S. PATENT DOCUMENTS

| | | | |
|---|---|---|---|
| 2009/0025027 A1* | 1/2009 | Craner | 725/32 |
| 2009/0031341 A1* | 1/2009 | Schlack et al. | 725/38 |
| 2009/0041118 A1 | 2/2009 | Pavlovskaia et al. | |
| 2009/0083781 A1 | 3/2009 | Yang et al. | |
| 2009/0083813 A1* | 3/2009 | Dolce et al. | 725/93 |
| 2009/0083824 A1* | 3/2009 | McCarthy et al. | 725/151 |
| 2009/0089188 A1* | 4/2009 | Ku et al. | 705/30 |
| 2009/0094113 A1* | 4/2009 | Berry et al. | 705/14 |
| 2009/0094646 A1* | 4/2009 | Walter et al. | 725/48 |
| 2009/0100465 A1* | 4/2009 | Kulakowski | 725/39 |
| 2009/0100489 A1* | 4/2009 | Strothmann | 725/114 |
| 2009/0106269 A1* | 4/2009 | Zuckerman et al. | 707/10 |
| 2009/0106386 A1* | 4/2009 | Zuckerman et al. | 709/215 |
| 2009/0106392 A1* | 4/2009 | Zuckerman et al. | 709/217 |
| 2009/0106425 A1* | 4/2009 | Zuckerman et al. | 709/226 |
| 2009/0106441 A1* | 4/2009 | Zuckerman et al. | 709/231 |
| 2009/0106451 A1* | 4/2009 | Zuckerman et al. | 709/239 |
| 2009/0106511 A1* | 4/2009 | Zuckerman et al. | 711/154 |
| 2009/0113009 A1* | 4/2009 | Slemmer et al. | 709/206 |
| 2009/0138966 A1 | 5/2009 | Krause et al. | |
| 2009/0144781 A1 | 6/2009 | Glaser et al. | |
| 2009/0146779 A1* | 6/2009 | Kumar et al. | 340/5.31 |
| 2009/0157868 A1 | 6/2009 | Chaudhry | |
| 2009/0158369 A1 | 6/2009 | Van Vleck et al. | |
| 2009/0160694 A1* | 6/2009 | Di Flora | 341/176 |
| 2009/0172757 A1 | 7/2009 | Aldrey et al. | |
| 2009/0178098 A1* | 7/2009 | Westbrook et al. | 725/115 |
| 2009/0183219 A1* | 7/2009 | Maynard et al. | 725/116 |
| 2009/0189890 A1 | 7/2009 | Corbett et al. | |
| 2009/0193452 A1 | 7/2009 | Russ et al. | |
| 2009/0196346 A1 | 8/2009 | Zhang et al. | |
| 2009/0204920 A1 | 8/2009 | Beverley et al. | |
| 2009/0210899 A1 | 8/2009 | Lawrence-Apfelbaum et al. | |
| 2009/0225790 A1 | 9/2009 | Shay et al. | |
| 2009/0228620 A1* | 9/2009 | Thomas et al. | 710/65 |
| 2009/0228922 A1 | 9/2009 | Haj-Khalil et al. | |
| 2009/0233593 A1 | 9/2009 | Ergen et al. | |
| 2009/0251478 A1 | 10/2009 | Maillot et al. | |
| 2009/0254960 A1* | 10/2009 | Yarom et al. | 725/115 |
| 2009/0265617 A1 | 10/2009 | Randall et al. | |
| 2009/0271512 A1 | 10/2009 | Jorgensen | |
| 2009/0271818 A1* | 10/2009 | Schlack | 725/33 |
| 2009/0298535 A1* | 12/2009 | Klein et al. | 455/556.1 |
| 2009/0313674 A1 | 12/2009 | Ludvig et al. | |
| 2009/0328109 A1 | 12/2009 | Pavlovskaia et al. | |
| 2010/0033638 A1* | 2/2010 | O'Donnell et al. | 348/734 |
| 2010/0058404 A1 | 3/2010 | Rouse | |
| 2010/0067571 A1 | 3/2010 | White et al. | |
| 2010/0077441 A1* | 3/2010 | Thomas et al. | 725/133 |
| 2010/0104021 A1 | 4/2010 | Schmit | |
| 2010/0115573 A1* | 5/2010 | Srinivasan et al. | 725/131 |
| 2010/0118972 A1 | 5/2010 | Zhang et al. | |
| 2010/0131996 A1 | 5/2010 | Gauld | |
| 2010/0146139 A1 | 6/2010 | Brockmann | |
| 2010/0158109 A1 | 6/2010 | Dahlby et al. | |
| 2010/0166071 A1 | 7/2010 | Wu et al. | |
| 2010/0174776 A1 | 7/2010 | Westberg et al. | |
| 2010/0175080 A1* | 7/2010 | Yuen et al. | 725/32 |
| 2010/0180307 A1* | 7/2010 | Hayes et al. | 725/51 |
| 2010/0211983 A1 | 8/2010 | Chou | |
| 2010/0226428 A1 | 9/2010 | Thevathasan et al. | |
| 2010/0235861 A1 | 9/2010 | Schein et al. | |
| 2010/0242073 A1 | 9/2010 | Gordon et al. | |
| 2010/0251167 A1 | 9/2010 | DeLuca et al. | |
| 2010/0254370 A1* | 10/2010 | Jana et al. | 370/352 |
| 2010/0325655 A1* | 12/2010 | Perez | 725/30 |
| 2011/0002376 A1 | 1/2011 | Ahmed et al. | |
| 2011/0002470 A1 | 1/2011 | Purnhagen et al. | |
| 2011/0023069 A1 | 1/2011 | Dowens | |
| 2011/0035227 A1 | 2/2011 | Lee et al. | |
| 2011/0067061 A1 | 3/2011 | Karaoguz et al. | |
| 2011/0096828 A1 | 4/2011 | Chen et al. | |
| 2011/0107375 A1* | 5/2011 | Stahl et al. | 725/46 |
| 2011/0110642 A1 | 5/2011 | Salomons et al. | |
| 2011/0150421 A1 | 6/2011 | Sasaki et al. | |
| 2011/0153776 A1 | 6/2011 | Opala et al. | |
| 2011/0167468 A1 | 7/2011 | Lee et al. | |
| 2011/0243024 A1 | 10/2011 | Osterling et al. | |
| 2011/0258584 A1 | 10/2011 | Williams et al. | |
| 2011/0289536 A1* | 11/2011 | Poder et al. | 725/95 |
| 2011/0317982 A1 | 12/2011 | Xu et al. | |
| 2012/0023126 A1 | 1/2012 | Jin et al. | |
| 2012/0030212 A1 | 2/2012 | Koopmans et al. | |
| 2012/0137337 A1 | 5/2012 | Sigmon et al. | |
| 2012/0204217 A1 | 8/2012 | Regis et al. | |
| 2012/0209815 A1 | 8/2012 | Carson et al. | |
| 2012/0224641 A1 | 9/2012 | Haberman et al. | |
| 2012/0257671 A1 | 10/2012 | Brockmann et al. | |
| 2013/0003826 A1 | 1/2013 | Craig et al. | |
| 2013/0086610 A1 | 4/2013 | Brockmann | |
| 2013/0179787 A1 | 7/2013 | Brockmann et al. | |
| 2013/0198776 A1 | 8/2013 | Brockmann | |
| 2013/0272394 A1 | 10/2013 | Brockmann et al. | |
| 2014/0033036 A1 | 1/2014 | Gaur et al. | |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| DE | 4408355 A1 | 10/1994 |
| DE | 69516139 D1 | 12/2000 |
| DE | 69132518 D1 | 9/2001 |
| DE | 69333207 D1 | 7/2004 |
| DE | 98961961 T1 | 8/2007 |
| DE | 602008001596 D1 | 8/2010 |
| DE | 602006015650 D1 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0633219 A1 | 2/1995 |
| EP | 0643523 A1 | 3/1995 |
| EP | 0661888 A2 | 7/1995 |
| EP | 0714684 A1 | 6/1996 |

(56) References Cited

FOREIGN PATENT DOCUMENTS

| | | |
|---|---|---|
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1725044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 D0 | 12/2011 |
| IL | 222829 D0 | 12/2012 |
| IL | 222830 D0 | 12/2012 |
| IL | 225525 D0 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 7160292 A | 6/1995 |
| JP | 8095599 A | 4/1996 |
| JP | 8-265704 A | 10/1996 |
| JP | 8265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |
| JP | 2004-135932 A | 5/2004 |
| JP | 2004-264812 A | 9/2004 |
| JP | 2004-533736 A | 11/2004 |
| JP | 2004-536381 A | 12/2004 |
| JP | 2004-536681 | 12/2004 |
| JP | 2005-033741 | 2/2005 |
| JP | 2005-084987 A | 3/2005 |
| JP | 2005-095599 | 3/2005 |
| JP | 8-095599 A | 4/2005 |
| JP | 2005-156996 | 6/2005 |
| JP | 2005-519382 | 6/2005 |
| JP | 2005-523479 A | 8/2005 |
| JP | 2005-309752 | 11/2005 |
| JP | 2006-067280 | 3/2006 |
| JP | 2006-512838 | 4/2006 |
| JP | 11-88419 | 9/2007 |
| JP | 2008-523880 | 7/2008 |
| JP | 2008-535622 A | 9/2008 |
| JP | 04252727 B2 | 4/2009 |
| JP | 2009-543386 A | 12/2009 |
| JP | 2011-108155 A | 6/2011 |
| JP | 2012-080593 A | 4/2012 |
| JP | 04996603 B2 | 8/2012 |
| JP | 05121711 B2 | 1/2013 |
| JP | 53-004612 A | 10/2013 |
| JP | 05331008 B2 | 10/2013 |
| JP | 05405819 B2 | 2/2014 |
| KR | 2006067924 A | 6/2006 |
| KR | 2007038111 A | 4/2007 |
| KR | 20080001298 A | 1/2008 |
| KR | 2008024189 A | 3/2008 |
| KR | 2010111739 A | 10/2010 |
| KR | 2010120187 A | 11/2010 |
| KR | 2010127240 A | 12/2010 |
| KR | 2011030640 A | 3/2011 |
| KR | 2011129477 A | 12/2011 |
| KR | 20120112683 A | 10/2012 |
| KR | 2013061149 A | 6/2013 |
| KR | 2013113925 A | 10/2013 |
| KR | 1333200 B1 | 11/2013 |
| KR | 2008045154 A | 11/2013 |
| KR | 2013138263 A | 12/2013 |
| NL | 1032594 C2 | 4/2008 |
| NL | 1033929 C1 | 4/2008 |
| NL | 2004670 A | 11/2011 |
| NL | 2004780 A | 1/2012 |
| NZ | 239969 A | 12/1994 |

(56) References Cited

FOREIGN PATENT DOCUMENTS

| | | |
|---|---|---|
| PT | 99110 A | 12/1993 |
| WO | WO 8202303 A1 | 7/1982 |
| WO | WO 8908967 A1 | 9/1989 |
| WO | WO 90/13972 A1 | 11/1990 |
| WO | WO 93/22877 A2 | 11/1993 |
| WO | WO 9416534 A2 | 7/1994 |
| WO | WO 9419910 A1 | 9/1994 |
| WO | WO 9421079 A1 | 9/1994 |
| WO | WO 95/15658 A1 | 6/1995 |
| WO | WO 9532587 A1 | 11/1995 |
| WO | WO 9533342 A1 | 12/1995 |
| WO | WO 9614712 A1 | 5/1996 |
| WO | WO 9627843 A1 | 9/1996 |
| WO | WO 9631826 A1 | 10/1996 |
| WO | WO 9637074 A2 | 11/1996 |
| WO | WO 9642168 A1 | 12/1996 |
| WO | WO 9716925 A1 | 5/1997 |
| WO | WO 9733434 A1 | 9/1997 |
| WO | WO 9739583 A1 | 10/1997 |
| WO | WO 9826595 A1 | 6/1998 |
| WO | WO 99/00735 A1 | 1/1999 |
| WO | WO 99/04568 | 1/1999 |
| WO | WO 9900735 A1 | 1/1999 |
| WO | WO 9930496 A1 | 6/1999 |
| WO | WO 9930497 A1 | 6/1999 |
| WO | WO 9930500 A1 | 6/1999 |
| WO | WO 9930501 A1 | 6/1999 |
| WO | WO 9935840 A1 | 7/1999 |
| WO | WO 9941911 A1 | 8/1999 |
| WO | WO 9956468 A1 | 11/1999 |
| WO | WO 99/65232 A1 | 12/1999 |
| WO | WO 99/65243 A1 | 12/1999 |
| WO | WO 9966732 A1 | 12/1999 |
| WO | WO 0002303 A1 | 1/2000 |
| WO | WO 00/07372 A1 | 2/2000 |
| WO | WO 00/08967 A1 | 2/2000 |
| WO | WO 00/19910 A1 | 4/2000 |
| WO | WO 00/38430 A1 | 6/2000 |
| WO | WO 00/41397 | 7/2000 |
| WO | WO 01/39494 A1 | 5/2001 |
| WO | WO 01/41447 A1 | 6/2001 |
| WO | WO 01/82614 A1 | 11/2001 |
| WO | WO 01/92973 | 12/2001 |
| WO | WO 02/089487 A2 | 7/2002 |
| WO | WO 02/076097 A1 | 9/2002 |
| WO | WO 02/076099 A1 | 9/2002 |
| WO | WO 03/026232 A1 | 3/2003 |
| WO | WO 03/026275 A2 | 3/2003 |
| WO | WO 03/047710 A2 | 6/2003 |
| WO | WO 03/065683 A1 | 8/2003 |
| WO | WO 03/071727 A2 | 8/2003 |
| WO | WO 03/091832 A2 | 11/2003 |
| WO | WO 2004/012437 A2 | 2/2004 |
| WO | WO 2004/018060 A2 | 3/2004 |
| WO | WO 2004/073310 A2 | 8/2004 |
| WO | WO 2005/002215 A1 | 1/2005 |
| WO | WO 2005/041122 A2 | 5/2005 |
| WO | WO 2005/053301 A2 | 6/2005 |
| WO | WO 2005/120067 A2 | 12/2005 |
| WO | WO 2006/014362 A1 | 2/2006 |
| WO | WO 2006/022881 A1 | 3/2006 |
| WO | WO 2006/053305 | 5/2006 |
| WO | WO 2006/067697 A2 | 6/2006 |
| WO | WO 2006/081634 A2 | 8/2006 |
| WO | WO 2006/105480 | 10/2006 |
| WO | WO 2006/110268 A1 | 10/2006 |
| WO | WO 2007/001797 A1 | 1/2007 |
| WO | WO 2007/008319 A1 | 1/2007 |
| WO | WO 2007/008355 A2 | 1/2007 |
| WO | WO 2007/008356 A1 | 1/2007 |
| WO | WO 2007/008357 A1 | 1/2007 |
| WO | WO 2007/008358 A1 | 1/2007 |
| WO | WO 2007/018722 A2 | 2/2007 |
| WO | WO 2007/018726 A2 | 2/2007 |
| WO | WO 2008/044916 A2 | 4/2008 |
| WO | WO 2008/086170 A1 | 7/2008 |
| WO | WO 2008/088741 A2 | 7/2008 |
| WO | WO 2008/088752 A2 | 7/2008 |
| WO | WO 2008/088772 A2 | 7/2008 |
| WO | WO 2008/100205 A1 | 8/2008 |
| WO | WO 2009/038596 A1 | 3/2009 |
| WO | WO 2009/099893 A1 | 8/2009 |
| WO | WO 2009/099895 A1 | 8/2009 |
| WO | WO 2009/105465 A2 | 8/2009 |
| WO | WO 2009/110897 A1 | 9/2009 |
| WO | WO 2009/114247 A2 | 9/2009 |
| WO | WO 2009/155214 A2 | 12/2009 |
| WO | WO 2010/044926 A3 | 4/2010 |
| WO | WO 2010/054136 A2 | 5/2010 |
| WO | WO 2010/107954 A2 | 9/2010 |
| WO | WO 2011/014336 A1 | 9/2010 |
| WO | WO 2011/082364 A2 | 7/2011 |
| WO | WO 2011/139155 A1 | 11/2011 |
| WO | WO 2011/149357 A1 | 12/2011 |
| WO | WO 2012/051528 A2 | 4/2012 |
| WO | WO 2012/138660 | 10/2012 |
| WO | WO 2012/138660 A2 | 10/2012 |
| WO | WO 2013/106390 A1 | 7/2013 |
| WO | WO 2013/155310 A1 | 7/2013 |

OTHER PUBLICATIONS

Activevideo Networks Inc., International Search Report and Written Opinion, PCT/US2011/056355, Apr. 13, 2012, 7 pgs.
AC-3 digital audio compression standard, Extract, Dec. 20, 1995, 11 pgs.
ActiveVideo Networks BV, International Preliminary Report on Patentability, PCT/NL2011/050308, Sep. 6, 2011, 8 pgs.
ActiveVideo Networks BV, International Search Report and Written Opinion, PCT/NL2011/050308, Sep. 6, 2011, 8 pgs.
ActiveVideo Networks Inc., International Preliminary Report on Patentability, PCT/US2012/032010, Oct. 8, 2013, 4 pgs.
ActiveVideo Networks Inc., International Search Report and Written Opinion, PCT/US2012/032010, Oct. 10, 2012, 6 pgs.
ActiveVideo Networks Inc., International Search Report and Written Opinion, PCT/US2013/020769, May 9, 2013, 9 pgs.
ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
ActiveVideo Networks Inc., Extended EP Search Rpt, Application No. 09820936-4, 11 pgs.
ActiveVideo Networks Inc., Extended EP Search Rpt, Application No. 10754084-1, 11 pgs.
ActiveVideo Networks Inc., Extended EP Search Rpt, Application No. 10841764.3, 16 pgs.
ActiveVideo Networks Inc., Extended EP Search Rpt, Application No. 11833486.1, 6 pgs.
AcitveVideo Networks Inc., Korean Intellectual Property Office, International Search Report; PCT/US2009/032457, Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 Mbit, Jan. 1, 1992, 39 pgs.
Craig, Notice of Allowance, U.S. Appl. No. 11/178,176, Dec. 23, 2010, 8 pgs.

(56) References Cited

OTHER PUBLICATIONS

Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Notice of Allowance, U.S. Appl. No. 11/178,189, Oct. 12, 2011, 7 pgs.
Craig, Notice of Allowance, U.S. Appl. No. 11/178,176, Mar. 23, 2011, 8 pgs.
Craig, Notice of Allowance, U.S. Appl. No. 13/609,183, Aug. 26, 2013, 8 pgs.
Craig, Final Office Action, U.S. Appl. No. 11/103,838, Feb. 5, 2009, 30 pgs.
Craig, Final Office Action, U.S. Appl. No. 11/178,181, Aug. 25, 2010, 17 pgs.
Craig, Final Office Action, U.S. Appl. No. 11/103,838, Jul. 6, 2010, 35 pgs.
Craig, Final Office Action, U.S. Appl. No. 11/178,176, Oct. 1, 2010, 8 pgs.
Craig, Final Office Action, U.S. Appl. No. 11/178,183, Apr. 13, 2011, 16 pgs.
Craig, Final Office Action, U.S. Appl. No. 11/178,177, Oct. 26, 2010, 12 pgs.
Craig, Final Office Action, U.S. Appl. No. 11/178,181, Jun. 20, 2011, 21 pgs.
Craig, Office Action, U.S. Appl. No. 11/103,838, May 12, 2009, 32 pgs.
Craig, Office Action, U.S. Appl. No. 11/103,838, Aug. 19, 2008, 17 pgs.
Craig, Office Action, U.S. Appl. No. 11/103,838, Nov. 19, 2009, 34 pgs.
Craig, Office Action, U.S. Appl. No. 11/178,176, May 6, 2010, 7 pgs.
Craig, Office-Action U.S. Appl. No. 11/178,177, Mar. 29, 2011, 15 pgs.
Craig, Office Action, U.S. Appl. No. 11/178,177, Aug. 3, 2011, 26 pgs.
Craig, Office Action, U.S. Appl. No. 11/178,177, Mar. 29, 2010, 11 pgs.
Craig, Office Action, U.S. Appl. No. 11/178,181, Feb. 11, 2011, 19 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Office Action, U.S. Appl. No. 11/178,183, Dec. 6, 2010, 12 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.
Craig, Office Action, U.S. Appl. No. 11/178,189, Nov. 9, 2010, 13 pgs.
Craig, Office Action, U.S. Appl. No. 11/178,189, Mar. 15, 2010, 11 pgs.
Craig, Office Action, U.S. Appl. No. 11/178,189, Jul. 23, 2009, 10 pgs.
Craig, Office Action, U.S. Appl. No. 11/178,189, May 26, 2011, 14 pgs.
Craig, Office Action, U.S. Appl. No. 13/609,183, May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeg.org, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, May 23, 2012, 5 pgs.
Herr, Notice of Allowance, U.S. Appl. No. 12/534,016, Feb. 7, 2012, 5 pgs.
Herr, Notice of Allowance, U.S. Appl. No. 12/534,016, Sep. 28, 2011, 15 pgs.
Herr, Final Office Action, U.S. Appl. No. 11/620,593, Sep. 15, 2011, 104 pgs.
Herr, Office Action, U.S. Appl. No. 11/620,593, Mar. 19, 2010, 58 pgs.
Herr, Office Action, U.S. Appl. No. 11/620,593, Apr. 21, 2009 27 pgs.
Herr, Office Action, U.S. Appl. No. 11/620,593, Dec. 23, 2009, 58 pgs.
Herr, Office Action, U.S. Appl. No. 11/620,593, Jan. 24, 2011, 96 pgs.
Herr, Office Action, U.S. Appl. No. 11/620,593, Aug. 27, 2010, 41 pgs.
Herre, Thoughts on an SAOC Architecture, Oct. 2006, 9 pgs.
Hoarty, The Smart Headend—A Novel Approach to Interactive Television, Montreux Int'l TV Symposium, Jun. 9, 1995, 21 pgs.
ICTV, Inc., International Preliminary Report on Patentability, PCT/US2006/022585, Jan. 29, 2008, 9 pgs.
ICTV, Inc., International Search Report/Written Opinion, PCT/US2006/022585, Oct. 12, 2007, 15 pgs.
ICTV, Inc., International Search Report/Written Opinion, PCT/US2008/000419, May 15, 2009, 20 pgs.
ICTV, Inc., International Search Report/Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007. Not Found.
SAOC use cases, draft requirements and architecture, Oct. 2006, 16 pgs.
Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 1, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.

(56) References Cited

OTHER PUBLICATIONS

TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, in 1744/MUMNP/2007, Dec. 30, 2013, 6 pgs.
TVHEAD, Inc., International Search Report, PCT/US2006/010080, Jun. 20, 2006, 3 pgs.
TVHEAD, Inc., International Search Report, PCT/US2006/024194, Dec. 15, 2006, 4 pgs.
TVHEAD, Inc., International Search Report, PCT/US2006/024195, Nov. 29, 2006, 9 pgs.
TVHEAD, Inc., International Search Report, PCT/US2006/024196, Dec. 11, 2006, 4 pgs.
TVHEAD, Inc., International Search Report, PCT/US2006/024197, Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo Networks Inc., Communication Pursuant to Rule 94(3), EP08713106-6, Jun. 26, 2014, 5 pgs.
ActiveVideo Networks Inc., Examination Report No. 1, AU2011258972, Jul. 21, 2014, 3 pgs.
Brockmann, Office Action, U.S. Appl. No. 12/443,571, Nov. 5, 2014, 26 pgs.
ActiveVideo, http://www.activevideo.com/, as printed out in year 2012, 1 pg.
ActiveVideo Networks Inc., International Preliminary Report on Patentability, PCT/US2013/020769, Jul. 24, 2014, 6 pgs.
ActiveVideo Networks Inc., International Search Report and Written Opinion, PCT/US2014/030773, Jul. 25, 2014, 8 pgs.
ActiveVideo Networks Inc., International Search Report and Written Opinion, PCT/US2014/041416, Aug. 27, 2014, 8 pgs.
ActiveVideo Networks Inc., Extended EP Search Rpt, Application No. 13168509.1, 10 pgs.
ActiveVideo Networks Inc., Extended EP Search Rpt, Application No. 13168376-5, 8 pgs.
ActiveVideo Networks Inc., Extended EP Search Rpt, Application No. 12767642-7, 12 pgs.
ActiveVideo Networks Inc., Communication Pursuant to Rules 70(2) and 70a(2), EP10841764.3, Jun. 6, 2014, 1 pg.
ActiveVideo Networks Inc., Communication Pursuant to Article 94(3) EPC, EP08713106.6-1908, Jun. 25, 2014, 5 pgs.

ActiveVideo Networks Inc., Communication Pursuant to Article 94(3) EPC, EP08713106.6-2223, May 10, 2011, 7 pgs.
ActiveVideo Networks Inc., Communication Pursuant to Article 94(3) EPC, EP09713486.0, Apr. 14, 2014, 6 pgS.
ActiveVideo Networks Inc., Examination Report No. 1, AU2011258972, Apr. 4, 2013, 5 pgs.
ActiveVideo Networks Inc., Examination Report No. 1, AU2010339376, Apr. 30, 2014, 4 pgs.
ActiveVideo Networks Inc., Examination Report, App. No. EP11749946.7, Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report—International application No. PCT/US2010/027724, dated Oct. 28, 2010, together with the Written Opinion of the International Searching Authority, 7 pages.
Adams, Jerry, NTZ Nachrichtechnische Zeitschrift. vol. 40, No. 7, Jul. 1987, Berlin DE pp. 534-536; Jerry Adams: 'Glasfasernetz für Breitbanddienste in London', 5 pgs. No English Translation Found, fiber-optic network for broadband services in London.
Avinity Systems B.V., Communication pursuant to Article 94(3) EPC, EP 07834561.8, Jan. 31, 2014, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Mar. 31, 2009, 12 pgs.
Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection for Patent, JP 2009-530298, Sep. 25, 2012, 6 pgs.
Bird et al., "Customer Access to Broadband Services," ISSLS 86—The International Symposium on Subrscriber Loops and Services Sep. 29, 1986, Tokyo, JP 6 pgs.
Brockmann, Final Office Action, U.S. Appl. No. 13/668,004, Jul. 16, 2014, 20 pgs.
Brockmann, Office Action, U.S. Appl. No. 13/686,548, Mar. 10, 2014, 11 pgs.
Brockmann, Office Action, U.S. Appl. No. 13/668,004, Dec. 23, 2013, 9 pgs.
Brockmann, Final Office Action, U.S. Appl. No. 13/438,617, Oct. 3, 2014, 19 pgs.
Brockmann, Office Action, U.S. Appl. No. 13/438,617, May 12, 2014, 17 pgs.
Brockmann, Final Office Action, U.S. Appl. No. 12/443,571, Mar. 7, 2014, 21 pgs.
Brockmann, Office Action, U.S. Appl. No. 12/443,571, Jun. 5, 2013, 18 pgs.
Chang, Shih-Fu, et al., "Manipulation and Compositing of MC-DOT Compressed Video," IEEE Journal on Selected Areas of Communications, Jan. 1995, vol. 13, No. 1, 11 pgs. Best Copy Available.
Dahlby, Office Action, U.S. Appl. No. 12/651,203, Jun. 5, 2014, 18 pgs.
Dahlby, Final Office Action, U.S. Appl. No. 12/651,203, Feb. 4, 2013, 18 pgs.
Dahlby, Office Action, U.S. Appl. No. 12/651,203, Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution—Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.

(56) References Cited

OTHER PUBLICATIONS

Gordon, Notice of Allowance, U.S. Appl. No. 12/008,697, Mar. 20, 2014, 10 pgs.
Gordon, Final Office Action, U.S. Appl. No. 12/008,722, Mar. 30, 2012, 16 pgs.
Gordon, Final Office Action, U.S. Appl. No. 12/035,236, Jun. 11, 2014, 14 pgs.
Gordon, Final Office Action, U.S. Appl. No. 12/035,236, Jul. 22, 2013, 7 pgs.
Gordon, Final Office Action, U.S. Appl. No. 12/035,236, Sep. 20, 2011, 8 pgs.
Gordon, Final Office Action, U.S. Appl. No. 12/035,236, Sep. 21, 2012, 9 pgs.
Gordon, Final Office Action, U.S. Appl. No. 12/008,697, Mar. 6, 2012, 48 pgs.
Gordon, Office Action, U.S. Appl. No. 12/035,236, Mar. 13, 2013, 9 pgs.
Gordon, Office Action, U.S. Appl. No. 12/035,236, Mar. 22, 2011, 8 pgs.
Gordon, Office Action, U.S. Appl. No. 12/035,236, Mar. 28, 2012, 8 pgs.
Gordon, Office Action, U.S. Appl. No. 12/035,236, Dec. 16, 2013, 11 pgs.
Gordon, Office Action, U.S. Appl. No. 12/008,697, Aug. 1, 2013, 43 pgs.
Gordon, Office Action, U.S. Appl. No. 12/008,697, Aug. 4, 2011, 39 pgs.
Gordon, Office Action, U.S. Appl. No. 12/008,722, Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.
Insight advertisement, "In two years this is going to be the most watched program on TV" On touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
ICTV, Inc., International Search Report/Written Opinion, PCT/US2008/000400, Jul. 14, 2009, 10 pgs.
ICTV, Inc., International Search Report/Written Opinion, PCT/US2008/000450, Jan. 26, 2009, 9 pgs.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob,"MPEG-4 Overview—Overview of the MPEG-4 Standard" Internet Citation, Mar. 2001 (2001-03), http://mpeg.telecomitalialab.com/standards/mpeg-4/mpeg-4.htm, May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9,2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al. "Integrating Entertainment and Voice on the Cable Network," SCTE, Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs. Best Copy Available.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.

Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, Sep. 2, 2014, 8 pgs.
Regis, Notice of Allowance U.S. Appl. No. 13/273,803, May 14, 2014, 8 pgs.
Regis, Final Office Action U.S. Appl. No. 13/273,803, Oct. 11, 2013, 23 pgs.
Regis, Office Action U.S. Appl. No. 13/273,803, Mar. 27, 2013, 32 pgs.
Richardson, Ian E.G., "H.264 and MPEG-4 Video Compression, Video Coding for Next-Genertion Multimedia," John Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. Sac-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, Sep. 22, 2014, 5 pgs.
Sigmon, Notice of Allowance, U.S. Appl. No. 13/311,203, Feb. 27, 2014, 14 pgs.
Sigmon, Final Office Action, U.S. Appl. No. 13/311,203, Sep. 13, 2013, 20 pgs.
Sigmon, Office Action, U.S. Appl. No. 13/311,203, May 10, 2013, 21 pgs.
Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA, IEEE, US, May 31, 1998, 4 pgs, new ways to watch TV interactively with moving objects in digital.
Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," GNOSTECH Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al."An Enhanced Cost Effective Line Shuffle Scrambling System with Secure Conditional Access Authorization," 1993 NCTA Technical Papers, 11 pgs.
Jurgen__Two-way applications for cable television systems in the '70s, IEEE Spectrum, Nov. 1971, 16 pgs.

(56) References Cited

OTHER PUBLICATIONS va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.

Van der Star, Jack A. M., "Video on Demand Without Compression: A Review of the Business Model, Regulations and Future Implication," Proceedings of PTC'93, 15th Annual Conference, 12 pgs.

Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.

Yum, TS P., "Hierarchical Distribution of Video with Dynamic Port Allocation," IEEE Transactions on Communications, vol. 39, No. 8, Aug. 1, 1991, XP000264287, 7 pgs.

ActiveVideo Networks, Inc., International Preliminary Report on Patentablity, PCT/US2013/036182, Oct. 14, 2014, 9 pgs.

ActiveVideo Networks Inc., Communication Pursuant to Rule 94(3), EP08713106-6, Jun. 25, 2014, 5 pgs.

ActiveVideo Networks Inc., Communication Pursuant to Rule 94(3), EP09713486.0, Apr. 14, 2014, 6 pgs.

ActiveVideo Networks Inc., Communication Pursuant to Rules 70(2) and 70a(2), EP11833486.1, Apr. 24, 2014, 1 pg.

ActiveVideo Networks Inc., Communication Pursuant to Rules 161(2) & 162 EPC, EP13775121.0, Jan. 20, 2015, 3 pgs.

ActiveVideo Networks, Inc., International Search Report and Written Opinion, PCT/US2014/041430, Oct. 9, 2014, 9 pgs.

Active Video Networks, Notice of Reasons for Rejection, JP2012-547318, Sep. 26, 2014, 7 pgs.

ActiveVideo Networks Inc., Certificate of Patent JP5675765, Jan. 9, 2015, 3 pgs.

Avinity Systems B. V., Final Office Action, JP-2009-530298, Oct. 7, 2014, 8 pgs.

Brockmann, Notice of Allowance, U.S. Appl. No. 13/445,104, Dec. 24, 2014, 14 pgs.

Brockmann, Final Office Action, U.S. Appl. No. 13/686,548, Sep. 24, 2014, 13 pgs.

Brockmann, Office Action, U.S. Appl. No. 13/686,548, Jan. 5, 2015, 12 pgs.

Brockmann, Office Action, U.S. Appl. No. 13/911,948, Dec. 26, 2014, 12 pgs.

Brockmann, Office Action, U.S. Appl. No. 13/911,948, Jan. 29, 2015, 11 pgs.

Dahlby, Office Action, U.S. Appl. No. 12/651,203, Dec. 3, 2014, 19 pgs.

Gordon, Notice of Allowance, U.S. Appl. No. 12/008,697, Dec. 8, 2014, 10 pgs.

Gordon, Office Action, U.S. Appl. No. 12/008,722, Nov. 28, 2014, 18 pgs.

Regis, Notice of Allowance, U.S. Appl. No. 13/273,803, Nov. 18, 2014, 9 pgs.

Sigmon, Notice of Allowance, U.S. Appl. No. 13/311,203, Dec. 19, 2014, 5 pgs.

TAG Networks Inc, Decision to Grant a Patent, JP 2008-506474, Oct. 4, 2013, 5 pgs.

ActiveVideo Networks Inc., Decision to refuse a European patent application (Art. 97(2) EPC, EP09820936.4, Feb. 20, 2015, 4 pgs.

ActiveVideo Networks Inc., Communication Pursuant to Article 94(3) EPC, 10754084.1, Feb. 10, 2015, 12 pgs.

ActiveVideo Networks Inc., Communication under Rule 71(3) EPC, Intention to Grant, EP08713106.6, Feb. 19, 2015, 12 pgs.

ActiveVideo Networks Inc., Notice for Reasons for Rejection, JP2014-100460, Jan. 15, 2015, 6 pgs.

ActiveVideo Networks Inc., Notice for Rejection, JP2013-509016, Dec. 24, 2014 (Received Jan. 14, 2015), 11 pgs.

Brockmann, Office Action, U.S. Appl. No. 13/668,004, Feb. 26, 2015, 17 pgs.

Brockmann, Office Action, U.S. Appl. No. 13/737,097, Mar. 16, 2015, 18 pgs.

Craig, Decision on Appeal—Reversed—, U.S. Appl. No. 11/178,177, Feb. 25, 2015, 7 pgs.

Craig, Notice of Allowance, U.S. Appl. No. 11/178,177, Mar. 5, 2015, 7 pgs.

Craig, Notice of Allowance, U.S. Appl. No. 11/178,181, Feb. 13, 2015, 8 pgs.

* cited by examiner

STREAMING DIGITAL VIDEO BETWEEN VIDEO DEVICES USING A CABLE TELEVISION SYSTEM

CROSS-REFERENCE TO RELATED APPLICATION

This application claims the benefit of U.S. Provisional Application No. 61/393,262, filed Oct. 14, 2010, the contents of which are incorporated by reference in their entirety.

TECHNICAL FIELD

The present invention relates to sharing digital video between electronic devices, and more particularly to using a television system to establish a private, bidirectional data channel to stream personalized digital video for the enjoyment of subscribers.

BACKGROUND ART

Digital video forms an integral part of modern life. Private digital video devices allow us to record our life experiences for later review and enjoyment. Professional digital video, in the form of movies and television, allows us to see life through the eyes of others, and to benefit from their wisdom and their follies. As social creatures, we often wish to share these experiences with others, and we relish the opportunity to invite others into our homes for viewing sessions.

Digital media may be downloaded for viewing using a video player, or viewed on web sites such as YouTube using a web browser that supports streaming media. Digital media also may be recorded using video devices ranging from smartphones, to professional and amateur video cameras, to webcams on personal computers. There are many different and incompatible methods and locations for storing this media. As a result, there are many different and incompatible methods for later viewing: on a phone display, on a television screen, on a computer display (using one of several incompatible viewers). As a result, people who wish to later view this digital video must learn many different display and control interfaces, and educate themselves as to the intricacies of the different media formats. It would be simpler to view all digital media using a single video device, as the viewer would only have to learn how to use that single device.

It is known in the art to share video between computers and televisions, although methods for doing so are cumbersome or expensive. Some computers, including laptops, have video outputs that may be connected directly to a television video input using special cables. Setting up such systems is often difficult, as the process entails several steps of varying technical skill: analyzing the computer and the television to determine which kind of cable or cables are required; connecting the components properly; directing the computer to transmit video to the television, often through a non-intuitive sequence or combination of keystrokes or by running a custom application; tuning the television to the appropriate channel; adjusting the video resolution, size and position of the viewable area, brightness and color balance, and so on. Many of these steps are beyond the capabilities of the average person, and even if they are performed correctly, the video quality is often poor, and control of the television display must be performed awkwardly from the computer. Furthermore, for cable television subscribers, this arrangement often bypasses a cable set top box that controls ordinary cable television reception. Thus, a subscriber must learn how to change back and forth between ordinary cable television and the direct connection to the computer having the digital video.

One solution to this problem has been the use of an intermediate computer that interfaces to both the personal computer and the television. Commercial embodiments of this solution include the Apple TV® digital media extender from Apple, Inc. of Cupertino, Calif. However, this solution requires the user to purchase an additional computer and learn how to configure it, which some individuals may be unwilling or unable to do. Also, this solution requires the user to set up a wireless local network on the premises to allow the intermediate computer to connect to the personal computer, which a non-skilled person may find difficult. A different solution, in which the television itself has wireless networking and the personal computer connections with the television wirelessly, suffers from the same problem. Yet another solution is to convert the personal computer into a cable set top box, or "media center," using purchased or downloaded software. An advantage of using this approach is that other, more general applications found on the computer may be used on the television, such as web browsers, email clients and so on. Examples of this solution are the MythTV home entertainment application developed by Mr. Isaac Richards, and the Boxee system, from Boxee, Inc. However, these solutions do not solve the problem of avoiding complex and unfamiliar user interfaces, as they typically have custom menus and require the use of a keyboard and mouse to control the web browser, email client, and other added features that appear on the television. These solutions may also require the user to set up a wireless local area network, although some do permit direct cable connections from a set top box to the personal computer (with the aforementioned disadvantages).

SUMMARY OF ILLUSTRATED EMBODIMENTS

In accordance with various embodiments of the present invention, systems and methods are presented that overcome these difficulties by using existing cable television infrastructure to share digital video on smartphones, personal computers, and other devices with a set top box. These systems and methods do not require connecting a computer to a television with a cable, purchasing additional computers and configuring them, or setting up a local, wireless data connection on the premises. Furthermore, these systems are controlled using a standard set top box remote control, permitting cable subscribers to use a standard cable system menu, without being forced to use a keyboard and mouse to control the image displayed on the television or to learn a new menuing interface.

In a first embodiment there is provided a method of streaming digital video between a first video device and a second video device. The digital video may include audio data, moving image data, still image data, or any combination of these, and may be encoded according to an MPEG specification. The first video device, which may be a personal computer or a smartphone for example, is connected to a public data network, such as the Internet. The second video device may be a television or a TV set top box, and is connected to a cable television system having a cable network and a cable headend. The cable headend is also connected to the public data network. The second video device may be controlled by a video device controller, such as a remote control.

The method includes establishing a first bidirectional data channel from the first video device to the cable headend and establishing a second bidirectional data channel over the cable network from the second video device to the cable headend. Doing so permits bidirectional data communication between the first video device and the second video device through the cable headend. Once the data communication has been established, the method further includes receiving a first data stream that includes the digital video at the cable headend from the first video device using the first data channel. Next, the method includes forming a second data stream that includes a second video that is based on the received digital video. The second video may be the received digital video, or it may comprise a transcoding of the received digital video into a format that is decodable by the second video device. Furthermore, the second video may include a plurality of video frames, each video frame having a frame of the digital video stitched together with another image, such as a navigation button, an advertisement, information associated with the first video device, information associated with the digital video. The method further includes transmitting the second data stream from the cable headend to the second video device using the second data channel. The data stream is controlled by sending commands from the video device controller to the first video device over the first and second data channels. Finally, the second video may be displayed on a television.

In some related embodiments, the first and second video devices are located within the premises of an individual. In such cases, it may be the case that no bidirectional data channel between the first and second video devices exists entirely within the premises. In other related embodiments, establishing the first data channel includes receiving, from the first video device, a first request to establish the first data channel, the first request having request parameters that include a unique identifier; and authorizing the establishment of the first data channel based on the request parameters. The first request may be received over either the public data network or over the cable network. The unique identifier may be a media access control (MAC) address that is uniquely associated with the first video device. And establishing the second data channel may include receiving, from the second video device, a second request to establish the second data channel, the second request having request parameters that include the unique identifier; identifying the first video device using the received unique identifier; and associating the second video device with the identified first video device.

These methods may be implemented using the systems described below, or similar systems. Further, the methods may be implemented in computer hardware or software, or a combination of these. Computer software may be provided as a computer program product having program code stored thereon.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

Digital video refers to encoded digital data pertaining to a plurality of images, sounds, or both images and sounds. The plurality of images may include moving images, different images presented sequentially with a perceptible delay, or repetitions of a still image. The data may be encoded using any encoding format known in the art, especially a format according to an MPEG specification.

A video device refers to any electronic device capable of capturing, encoding, or displaying digital video, including without limitation smartphones, personal computers, video cameras, television set top boxes, and smart televisions.

A cable network is a network of physical cables that is used for distributing electrical or optical signals, including digital video. For example, a television system uses a network of coaxial or optical fiber cables to distribute television signals to subscribers.

Cable television system refers to a television system that delivers television signals to viewers using a cable network, be it electrical, optical, or a combination of these. While specific reference is made in various places to components of an electrical cable television system for ease of explanation, the corresponding components in a fiber optic television system are expressly contemplated.

A bidirectional data channel is a data channel that sends digital video from a first video device to a second video device in a first direction, and commands for controlling the first video device from the second video device to the first video device in the opposite direction. In embodiments of the invention, the second video device does not share video with the first video device, so the channel in the first direction may use a much higher data rate than the channel in the opposite direction.

Figure 1:
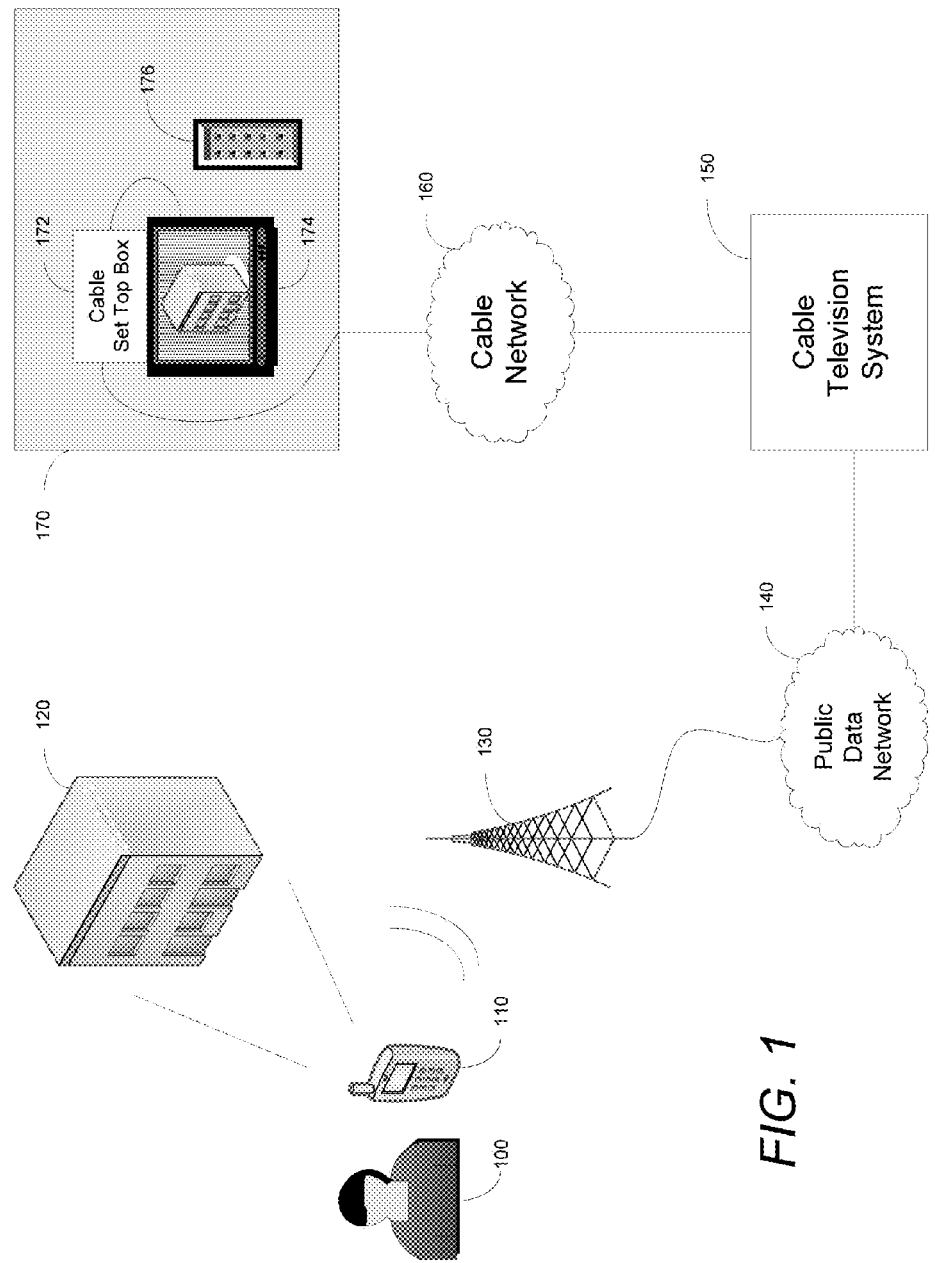
FIG. 1 is a depiction of an example embodiment of the invention in which an individual streams video data from a smartphone into a cable television system for display on a television.

FIG. 1 is a depiction of a typical embodiment of the invention. In accordance with this embodiment, an individual is able to take video of an interesting scene and stream it back to a television for viewing by someone else. The individual 100 possesses a video device, such as smartphone 110. The individual 100 uses smartphone 110 to capture streaming video (and perhaps audio) of an interesting scene, in this case a building 120. The smartphone 110 encodes the captured audiovisual data into digital video, and streams the digital video to a communications tower 130, for example using the smartphone's cellular network connection. Communications tower 130 transmits the digital video across a public data network 140, such as the Internet, to a cable television headend 150. The headend 150 forwards the digital video through a private cable network 160 to a subscriber premises 170. Inside the premises 170 is a typical cable television apparatus, including a cable set top box 172, a television 174, and a remote control 176. The cable set top box 172 receives the digital video and decodes it for display on the television 174. The remote control 176 is used to tune the set top box 172 to an appropriate channel for such display. In an alternate embodiment (not shown), the television 174 incorporates the decoding and tuning functions of the set top box 172, in which case the remote control 176 may directly control those functions inside the television.

As described in more detail below, cable television headend 150 performs any necessary reformatting and transcoding of the digital video stream to allow it to be viewed optimally on television 174. Such reformatting may include resizing the video, altering the video's resolution, mixing in other video such as advertisements, and other reformatting as is known in the art. Transcoding may include converting the digital video from a source format to a format that is decodable by the set top box 172.

Figure 2:
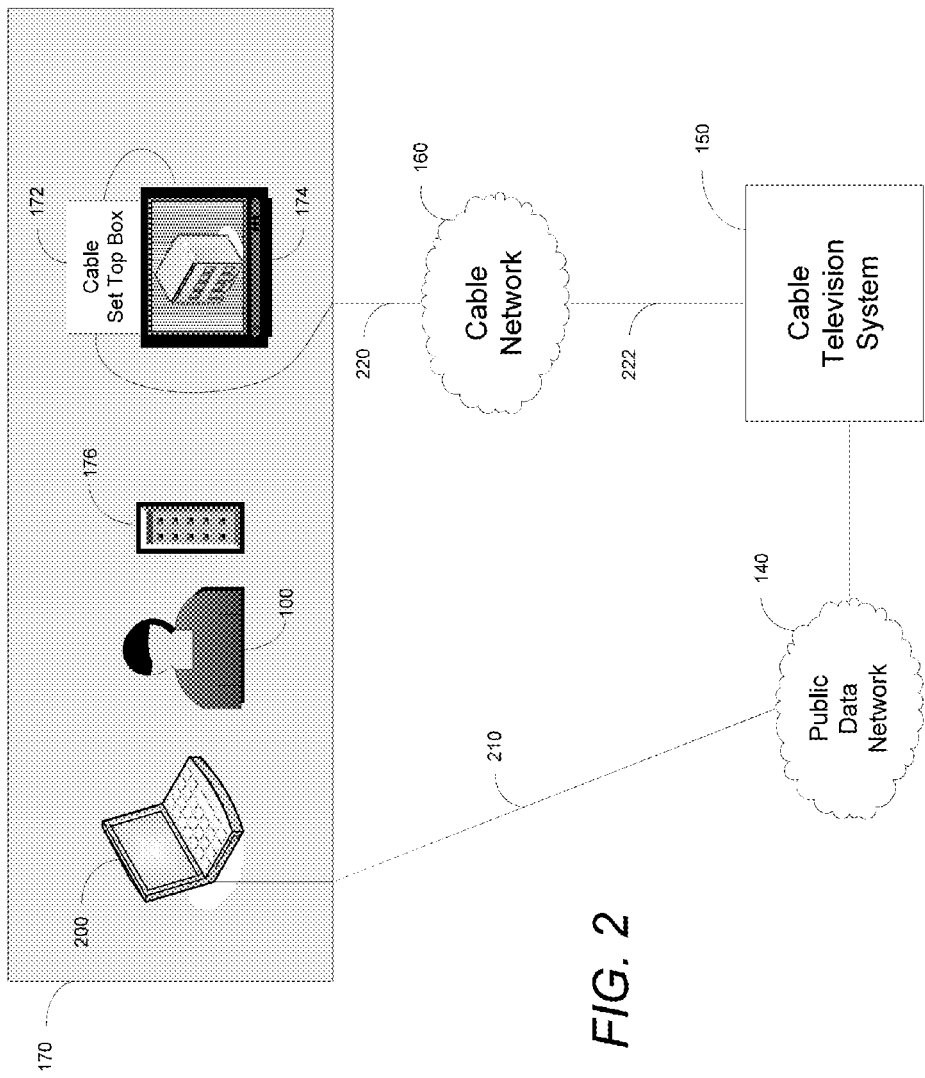
FIG. 2 is a depiction of a second example embodiment in which an individual streams video data from a personal computer to a television located on the same premises.

FIG. 2 is a depiction of a second example embodiment in which an individual streams video data from a personal computer to a television located on the same premises. In this embodiment the individual 100 accesses the digital video on a personal computer, such as laptop 200. For example, the individual 100 may have transferred to laptop 200 the video previously shot using the smartphone 110 from FIG. 1, and now wishes to relive a memory associated with the experience. Or, laptop 200 may contain digital video from another source, such as a DVD or Blu-Ray disc or a stored video file, and the individual wishes to watch the video on television 174 using the remote control 176 to control playback. This latter use case is advantageous in that the individual 100 need not possess a standalone player to be able to watch video discs.

In FIG. 2, the connection 210 to the public data network 140 may be accomplished using wires or cables, or it may be wireless. In a particularly advantageous embodiment, individual 100 is a cable television subscriber and cable television headend 150 provides Internet access. In this embodiment, connection 210, which is used to stream the digital video upstream, uses the same cables as connections 220, 222, which are used to stream appropriately encoded television signals to set top box 172 from the cable television headend 150. In this way, no additional cables are required to connect laptop 200 to set top box 172 or television 174.

However, it should be emphasized that, while the connection between laptop 200 and public data network 140 and the connection between headend 150 and set top box 172 may travel over the same physical cables, they comprise separate logical networks. For example, a cable television provider typically transmits data between headend 150 and premises 170 using signals having a frequency spectrum, and allocates different frequency windows to each connection. Frequencies belonging to the first connection may be selected using a signal filter in a cable modem. Thus, the laptop 200 does not have access to the television signals transmitted to set top box 172, and likewise set top box 172 does not have access to digital data on frequencies selected by the cable modem.

The arrangement of FIG. 2 is advantageous, because the set top box 172 integrates into the cable television system directly, so it is not necessary for subscriber 100 to separately purchase a second device (such as a second set top box) to share the digital video between devices. This arrangement may be used when there is no bidirectional data channel that connects the laptop 200 and the set top box 172, such as a wireless LAN, contained entirely within the premises.

Figure 3:
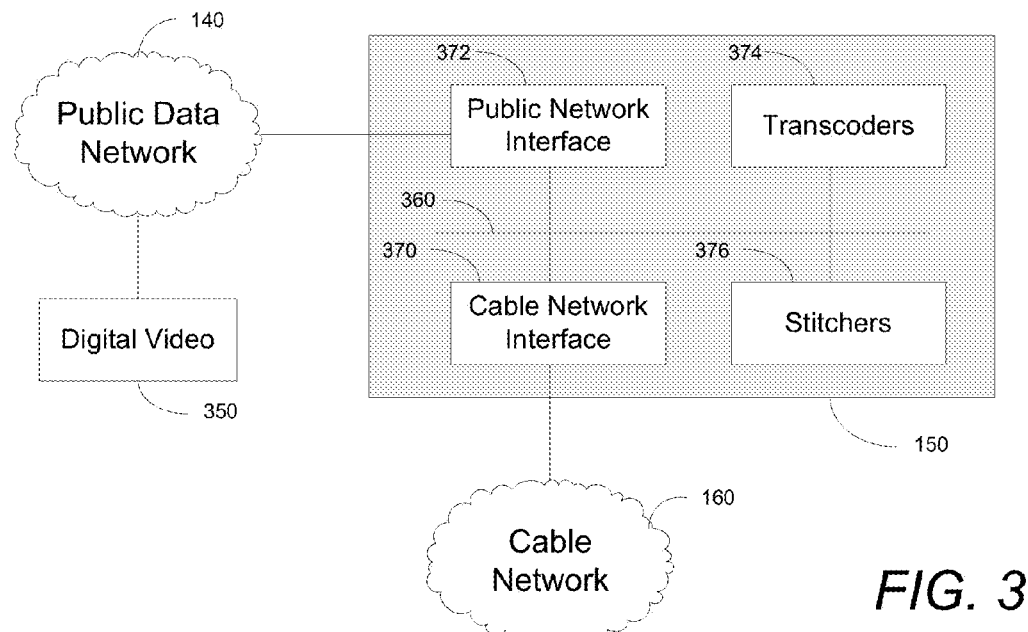
FIG. 3 is a block diagram showing the functional components of the embodiment of FIG. 2.
Figure 3:
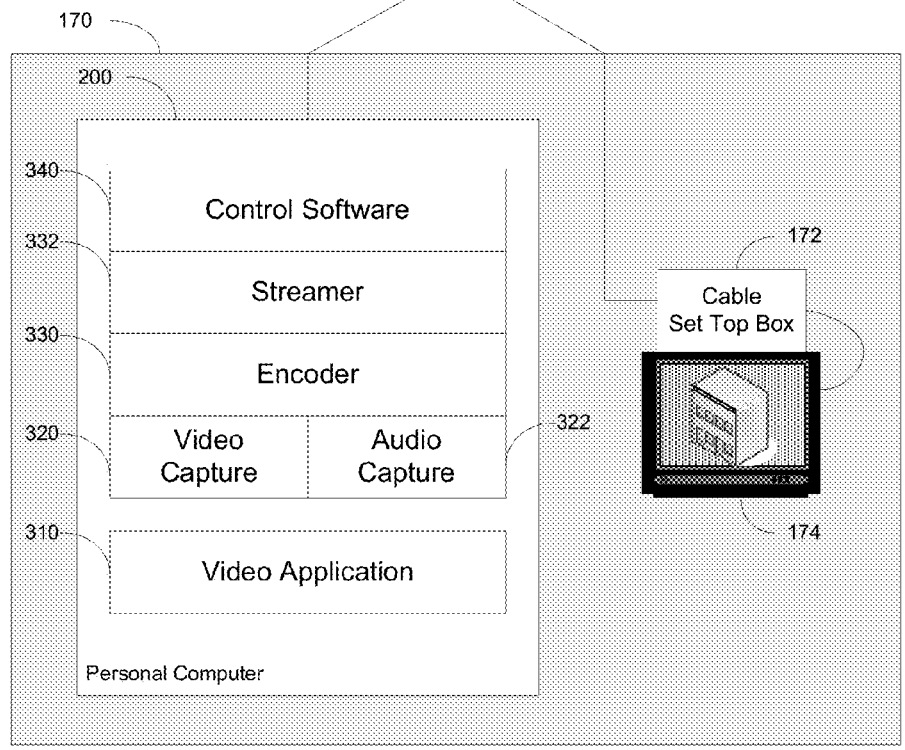

Details of these embodiments now follow. FIG. 3 is a block diagram showing the functional components of the embodiment of FIG. 2. Cable television headend 150 and personal computer 200 are shown in greater detail. In accordance with the embodiment shown in FIG. 3, the subscriber obtains internet access through cable television headend 150 so connection 210 is omitted for clarity. However, other embodiments are contemplated in which the subscriber obtains internet access through other means, such as the cellular network as shown in FIG. 1, so the embodiment shown in FIG. 3 should not be construed to limit the scope of the invention. Further, while reference will be made to personal computer 200, it will be understood that other video devices may be employed, such as the smartphone 110 shown in FIG. 1, provided that they have installed on them the appropriate hardware or software applications as now described. In addition, while the various components are described as software, it is contemplated that particularly computationally expensive operations such as video and audio capture or video encoding may be performed in hardware.

Referring to FIG. 3, the functions of personal computer 200 are explained in more detail. Personal computer 200 includes a video application 310. This video application 310 may be, by way of illustration: a web browser that displays web pages having embedded videos in Java, Flash, HTML 5, or other web video format; a proprietary video disc player application such as the CyberLink PowerDVD player; an application that plays digital video from a file or a URL, such as the Microsoft Windows Media Player or the Apple QuickTime Player; screen capture software, such as that found in remote desktop applications like Windows Terminal Server, VNC Server from RealVNC Limited, or any of several applications from Citrix Systems, Inc.; or any other application that provides digital video and may be controlled programmatically through an application programming interface 312. For concreteness, and not by way of limitation, video application 310 will be treated as a web browser having open a web page having embedded digital video 350.

Personal computer 200 also includes video capture software 320 and audio capture software 322. Capture software 320, 322 may be embodied in a single software package, or they may be separate, and perform video and audio capture according to techniques known in the art. Although both video and audio capture are shown in FIG. 3, audio capture may be omitted in various contemplated embodiments. For example, if video application 310 does not provide any audio, then cable television headend 150 will not receive any audio from personal computer 200. In such cases, headend 150 may optionally mix audio into the video to provide a more enjoyable subscriber experience. Such audio may be selectable by the subscriber from an audio library using a remote control, or it may be of the television operator's choosing. Also, in some embodiments video capture and audio capture are performed using hardware instead of software.

Captured video (and audio, if present) are sent to encoder 330, which encodes the video and audio into encoded digital video data according to an encoding format known in the art, such as MPEG. Encoder 330 presents the encoded digital video to streamer 332. Streamer 332 streams the encoded digital video to cable television headend 150 over a bidirectional data channel using techniques known in the art. In such a configuration, streamer 332 acts as a server, and headend 150 acts as a video client that requests the digital video after a connection with the second video device has been established.

Control software 340 is provided to control and monitor streamer 332, and to provide feedback to a user of personal computer 200. Control software 340 is executed by the user to launch the streaming components, and communicates with streamer 332 using a local network (TCP) connection. Control software 340, upon launch, establishes a service connection with headend 150, and obtains a list of authorized IP addresses that are permitted to access the streaming video data. When a client attempts to connect to the streamer 332 and request streaming video, streamer 332 requests authorization from control software 340. Control software determines whether the IP address is authorized, and responds to streamer 332 so that streamer 332 may accept or deny the connection as appropriate. Control software 340 may also direct streamer 332 to terminate execution at the request of a subscriber.

Conversely, streamer 332 may provide status updates to control software 340, such as whether streamer 332 is awaiting a connection with the headend 150, that such a connection has been established or torn down, or that streamer 332 is currently streaming digital video. Control software 340 may display these status updates on a display of personal computer 200. Encoder 330, streamer 332, and control software 340 may be provided by the cable television system operator as a single downloadable software application for the convenience of a subscriber.

The functions of cable television headend 150 are now explained in greater detail. Headend 150 includes several computing modules connected by a local area network 360. These modules include a cable network interface 370 for communicating with the cable network 160. Interface 370 may include, for example, a cable modem termination system (CMTS) that provides high speed data services, such as Internet access and digital video streaming, to subscribers. Interface 370, when employed to provide the Internet access required by web browser 310, forwards requests to a public network interface 372, such as a network router, that acts as a gateway to public data network 140. Other hardware and software used in this process is omitted for clarity, but can include various modules that provide data security such as encryption, virus detection and removal, and so on. Thus, for example, requests for digital video 350 from browser 310 are passed through the cable network 160, cable network interface 370, local area network 360, and public network interface 372 on their way to the public data network 140. This data path is comparable to data path 210 of FIG. 2.

In addition to these data components, cable television headend 150 also includes transcoders 374 and stitchers 376. As is known in the art, transcoders convert data encoded in one format into a different format. In this connection, digital video that is not displayable using cable set top box 172 is transcoded into the appropriate format. In one embodiment, to reduce latency between the video application and display of its content on the television 174, encoder 330 may encode captured video and audio data using a simple encoding scheme. Such simple encoding schemes may be desired in some embodiments if personal computer 200 is not computationally powerful. In an alternate embodiment, digital video 350 may be directly downloaded from the public data network 140 via the public network interface 372. In this embodiment, the digital video 350 is saved at the headend for later streaming playback, but its format may be different from what set top box 172 supports. In either case, transcoders 374 re-encode the data into an appropriate format that is decodable by set top box 172. One or more transcoders may be employed to accommodate the demand of many subscribers.

Stitchers 376 take the transcoded content, along with other audiovisual content such as interactive menus, advertisements, and the like, and stitch them together to make a final television signal for display on television 174. Stitchers 376 may also contain other logic, for example logic that determines what other content should be stitched together with the transcoded digital video, logic for processing control messages from a remote control 176 (such as menu item selection or movement commands, start/stop stream commands, and the like), and logic to perform other functions. As with the transcoders, several stitchers 376 may be employed within cable television headend 150 to meet subscriber demand. Cable network interface 370, public networking interface 372, transcoders 374, and stitchers 376 may be hardware, software, or a combination of these.

It should be appreciated that cable television headend 150 may be part of a cable television system comprising several such headends, each headend serving a different cable network in a different geographic area. Further, multiple cable television systems may be grouped together under the administrative control of a single multiple system operator (MSO), as is known in the art. In such larger systems, each headend may or may not include the functional units shown in FIG. 3. For example, transcoders 374 and stitchers 376 servicing headend 150 may be located at a different headend of the MSO, or at a data center remote from the headend 150. These remote transcoders and stitchers may be connected to headend 150 using a private data network of the MSO (not shown). The low latency added by such a physical arrangement of components, coupled with the ease of administration gained by placing multiple pieces of equipment having similar functions in the same physical location, provides advantages over prior art systems.

The processes for establishing data channels between the personal computer 200 and the set top box 172, and for streaming digital video over those channels, are now described. These data channels are bidirectional. In a first direction, the personal computer 200 streams digital video to cable television headend 150, which forwards the video (after transcoding and stitching) to set top box 172 for eventual display. In the opposite direction, set top box 172 receives keystrokes from a remote control. These keystrokes may include commands to establish the channel, tear down the channel, and to start and stop playback of video, or select a different digital video source. In some more generalized embodiments, keystrokes are sent from the remote control to control the personal computer 200 in ways unrelated to streaming the digital video. For example, the remote control may be used to select a computer shut down function, or to launch an application such as an email client that will then display on the television connected to set top box 172. Other ways in which a remote control may fully utilize the bidirectional data channel between the set top box 172 and personal computer 200 in accordance with these embodiments may be envisioned by persons having skill in the art.

Figure 4:
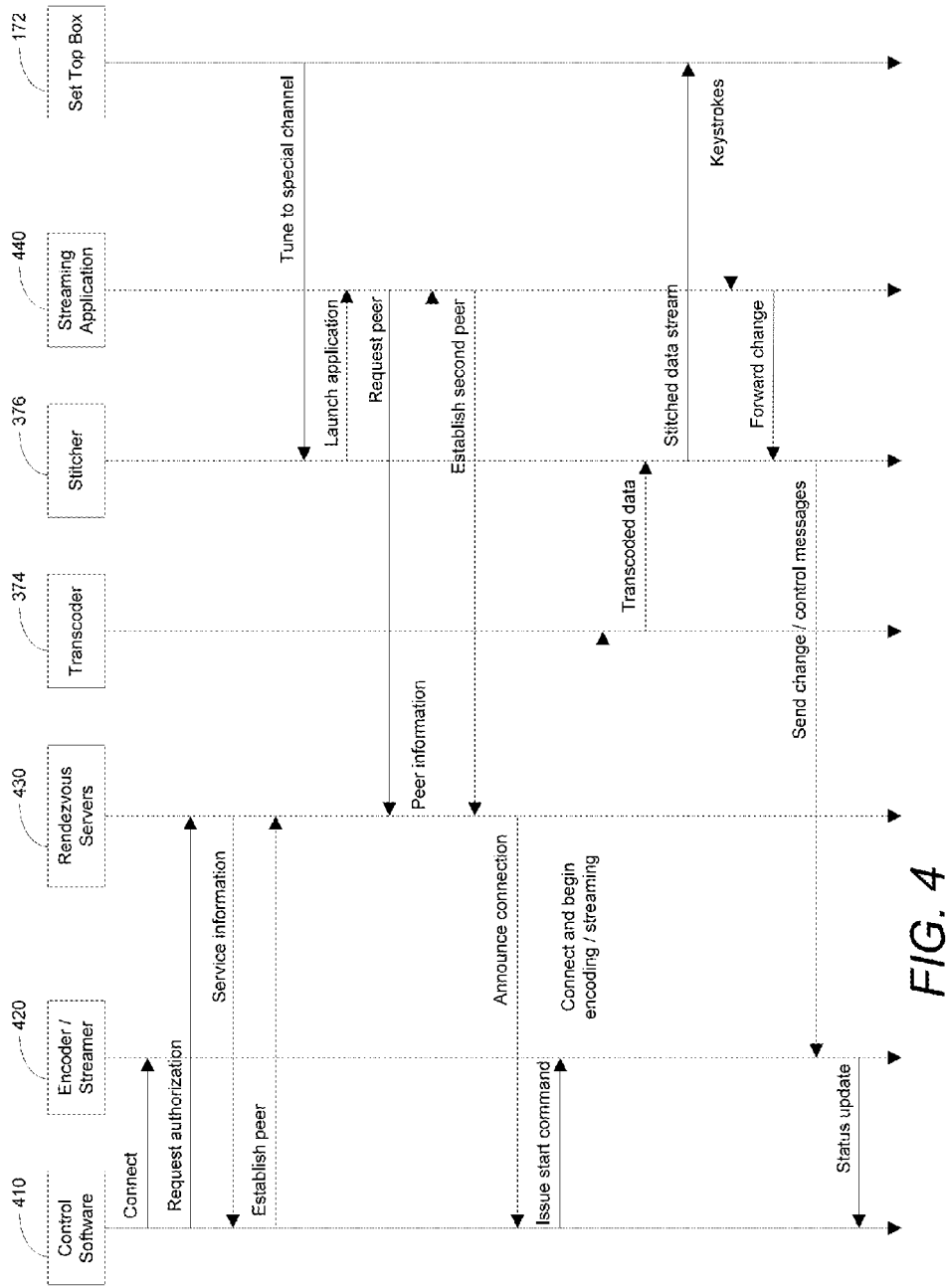
FIG. 4 is a timing diagram showing example processes that may be used to share digital video between a first video device and a second video device in accordance with an embodiment of the invention.

FIG. 4 is a timing diagram that illustrates the relevant processes. The first video device includes control software 410 and encoder/streamer 420, which appear in the example embodiment of FIG. 3 as control software 340, encoder 330, and streamer 332 respectively. The cable television headend includes transcoder 374 and stitcher 376, one or more rendezvous servers 430, and a streaming application 440, described in more detail below. The second video device in this example figure is a set top box 172. It will be appreciated that the only functionality required of set top box 172 is the ability to receive video data, change channels, and pass keystrokes upstream to a headend. No more complex hardware or software is required in the set top box 172, although some commercial embodiments may include them. It will be also appreciated that these processes are applicable not just to personal computers and set top boxes as described in the following, but may be generalized to operate on any video devices that are configured to play the roles of producer and consumer, respectively, of digital video.

In order to establish a bidirectional connection between the personal computer 200 and the set top box 172, two bidirectional data channels must be set up: one between the personal computer 200 and the cable television headend 150, and one between the headend 150 and the set top box 172. However, there is no pre-established association between a subscriber's set top box and her personal computer. Rendezvous servers 430 are provided at the headend to make this association, and to permit these two video devices to 'find each other', and to ensure authentication of the subscriber and authorization of the connection based on subscription and service parameters. Rendezvous may be facilitated using the fact that both video devices are associated with the subscriber. Rendezvous servers 430 accept offers to stream digital video and requests for the streamed digital video, and pair these offers and requests based on a unique subscriber identifier. The number of servers 430 used by any given headend may be determined by demand. In an alternate embodiment, a multiple system operator may house such rendezvous servers 430 at a data center or other location away from the cable headend that services the subscriber participating in these processes, and may share servers between headends depending on relative demand. Such an arrangement provides advantages when the MSO services several time zones, where demand for rendezvous services peaks and ebbs in different time zones at the same local time in each time zone.

In general, the cable television provider may wish to provide television signals to the subscriber at all times in order to avoid "dead air." Practically speaking, this means that the connection between the headend 150 and the set top box 172 should be made only after a digital video stream is already available; in other words, after the connection between the headend 150 and the personal computer 200 has already been established and is pending on a rendezvous server 430. Other embodiments are contemplated; for example, if the connection between the set top box 172 and the headend 150 is made first, headend 150 may give the subscriber a "Waiting" screen, advertisements, or otherwise fill the "dead air" with meaningful television signals of the television operator's choosing.

Streaming application 440 provides two functions. First, it communicates with rendezvous servers 430 on behalf of the set top box 172 to establish one of the two bidirectional data channels. Second, it receives commands from a remote control 176 (shown in FIGS. 1 and 2) via the set top box 172, and forwards them to the first video device. In some embodiments, the streaming application 440 runs on a computer processor located at the headend. In other embodiments, the processor may be located elsewhere, such as another headend, or an MSO data center in close proximity to the rendezvous servers 430.

To begin the process, control software 410 connects to encoder/streamer 420 and verifies that these modules are functioning correctly. Next, control software 410 requests authorization to establish a first data channel to stream video data by sending a request to a rendezvous server 430. This request includes parameters that identify the subscriber. Rendezvous server 430 determines whether to permit the establishment of the data channel based on the subscriber identification, and may include, in some embodiments, determining whether the subscriber has paid for this feature. If authorization is granted, the rendezvous server 430 transmits service information to control software 410. This service information includes, among other data, a list of authorized IP addresses belonging to transcoders 374 that are employed by the cable television operator. Control software 410 stores this service information, and notifies the rendezvous server 430 that it stands ready to stream digital video.

Next, the subscriber uses remote control 176 to direct the set top box 172 to tune to a special channel. The headend receives a channel designation for the special channel, and instructs stitcher 376, which is responsible for providing the final, stitched video to the set top box, to launch streaming application 440. Application 440, under the assumption that a streaming peer has already been established, immediately requests that peer's information from rendezvous server 430. This second request to establish a data channel includes parameters that uniquely identify the subscriber, similar to the first request to establish a data channel. Thus, for example, the application 440 may request a web page URL using an HTTP GET request that includes this information.

If the subscriber is not authorized to receive this service, an error message may be returned by rendezvous server 430, allowing the set top box 172 to send an error message to the television. Otherwise, server 430 returns a detailed response to this request. As several personal computers, smartphones, or other video devices may be providing streaming digital video and have established connections, rendezvous server 430 returns peer information pertaining to one or more peers that are available for viewing selection by identifying the video devices using the unique identifier and associating the set top box with these devices. The peer information may include, for example, a list of connected set top boxes at the subscriber premises, a list of disconnected set top boxes that are available to stream video, a list of set top boxes that are not available to stream video, and other useful information, such as Internet Protocol (IP) addresses, media access control (MAC) addresses, timestamps, and the like. Typically, this information is returned in an XML format, but other formats known in the art may be used. Application 440 may use the returned information to display a menu of choices to the subscriber on set top box 172. Once a selection of which digital video to view, application 440 requests the digital video from rendezvous server 430.

Now that both bidirectional data channels have been established, rendezvous server 430 announces the completed connection to control software 410 on the first video device. The announcement includes an address of a transcoder 374. Control software 410 then instructs encoder/streamer 420 to connect begin encoding and streaming the digital video as a server. At the same time, control software contacts the transcoder 374 from the announcement, instructing it to request the streamed digital video from the encoder/streamer 420 as a client. Transcoder 374 requests the video stream from encoder/streamer 420, which, as noted above, requests authorization to stream from control software 410.

The video data stream itself includes the digital video, as well as other data. As is known in the art, header information may be added to the digital video data, such as real time streaming protocol (RTSP) headers, transmission control protocol (TCP) or user datagram protocol (UDP) headers, internet protocol (IP) headers, Ethernet frame headers, and so on. The digital video data is encoded using an encoding format known in the art, or in the case of live capture, unformatted data may be streamed.

As transcoder 374 receives the video stream, it transcodes it into a format that is decodable by the set top box 172. Next, this transcoded video stream is passed to stitcher 376, which performs stitching, scaling, and other video manipulation. Stitcher 376 forms a second video stream for display, by optionally stitching the digital video with another image, such as context help information, one or more navigation buttons, a menuing interface, an advertisement, information associated with the first video device, or information associated with the digital video. This stitched digital video is then passed as a second data stream from the headend to the set top box 172, and from there to the television.

A subscriber can control the video stream from the remote control 176, and need not return to the personal computer 200 or other first video device to do so, because the data channels are bidirectional. In particular, the subscriber may use the remote control 176 to send keystroke commands to the streaming application 440, as shown. In this case, the streaming application 440 receives the keystrokes and determines what interactive feature the subscriber wishes to access. If the feature is relevant to the streaming of digital video, application 440 forwards this information to stitcher 376. For example, if the subscriber clicks a "stop" or "disconnect" button in the set top graphical interface, presses a channel up or channel down key, or navigates away from the special channel, the stitcher will be notified that new television signals are required. In this case, the stitcher will notify the encoder/streamer 420 that a change to the stream (i.e., a tear down) is required. If necessary, the encoder/streamer 420 will notify control software 410 of the change.

However, in some embodiments, the subscriber may perform other actions using the remote control. It is contemplated that a subscriber may use a graphical user interface, provided by stitcher 376 or streaming application 440 to set top box 172, to alter other stream parameters. These other parameters include, for example: audio and video encoding parameters, a video resolution, a new file name or URL to stream, and the like. Control software may then present these changes to the video application 310 using an application programming interface (API). The use of such APIs is known in the art for this purpose. It is contemplated that any parameter that may be altered using an API of a video application 310 may be accessed and changed using a set top box remote control.

Further, in some additional embodiments, the remote control 176 may be used to control other aspects of the function of the first video device. For instance, if the first video device is obtaining the digital video from a web site, the remote control 176 may be used to cause the first video device to navigate to a new URL to obtain new digital video. Or, the remote control 176 can be used to send real-time text message data to the first video device. This embodiment is particularly useful in the environment of FIG. 1 to request that the individual 100 use smartphone 110 to film a different interesting scene, or to provide feedback on the quality of the streamed video, for example. In alternate embodiments, such as that of FIG. 2, the remote control 176 may be used to control a personal computer 200 in other ways, such as launching and using an email client or other software application, directing the computer to shut down, or performing some other useful action. A person skilled in the art may envision other useful applications of the control channel.

Figure 5:
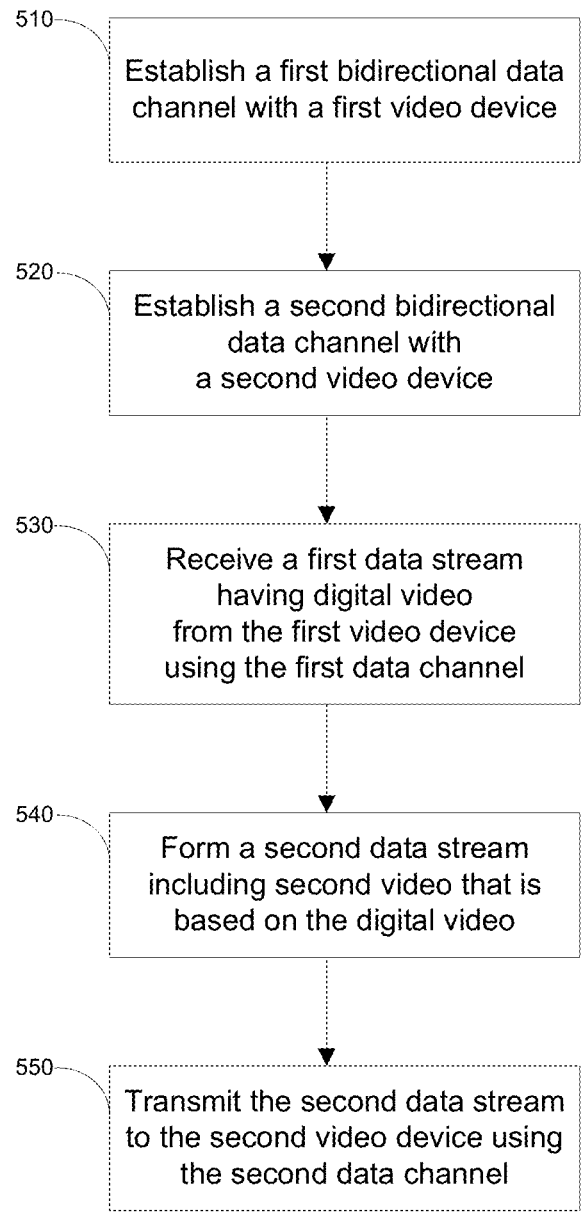
FIG. 5 is a flowchart showing these processes from the perspective of a cable television operator at a cable television headend.

FIG. 5 is a flowchart showing the processes in FIG. 4 from the perspective of a cable television operator at a cable television headend, such as headend 150. In step 510 the headend establishes a first bidirectional data channel with a first video device, such as smartphone 110 or personal computer 200. Typically, the headend will employ a rendezvous server for this purpose, and includes authorizing the establishment of the first data channel based on parameters sent to the rendezvous server. In step 520 the headend establishes a second bidirectional data channel with a second video device, such as set top box 172. This step is typically performed when the headend receives information that the set top box has tuned to a special channel devoted to this purpose. Once both connections have been established, the headend may display a menu on the special channel, informing the subscriber what devices are currently available to stream digital video for viewing, and permitting the subscriber to choose a device using a remote control. Once the subscriber makes a selection, the headend directs the first video device to begin streaming digital video in a first data stream. This first data stream is received by the headend using the first data channel in step 530, and may be requested by a transcoder located at the headend. In step 540, the headend forms a second data stream including second video that is based on the received digital video. For example, the transcoder may transcode the received digital video into a format that is decodable by the second video device, if necessary. The properly formatted video may then be stitched together with other video images, such as a menu that permits the subscriber to start and stop playback or otherwise control the video stream from the remote control. If the other video images should not be mixed with or overlaid onto the digital video, the digital video may also be scaled at this time to provide empty space in each video frame in which to stitch the other video images. The second data stream includes the final transcoded, stitched video. In step 550, the headend transmits the second data stream to the second video device using the second data channel. The second video device may then send the video to a viewing device, such as a television 174, for the subscriber's enjoyment.

It should be noted that this logic flow diagram is used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of streaming digital video between a first video device and a second video device, the first video device being connected to a public data network, wherein the second video device is connected to a cable television system having a cable network and a cable headend, the cable headend also being connected to the public data network, the second video device being controlled by a video device controller, the method comprising:
   establishing a first bidirectional data channel from the first video device to the cable headend;
   establishing a second bidirectional data channel over the cable network from the second video device to the cable headend, thereby permitting bidirectional data communication between the first video device and the second video device through the cable headend;
   receiving a first data stream that includes the digital video at the cable headend from the first video device using the first bidirectional data channel;
   forming a second data stream that includes a second video that is based on the digital video received in the first data stream; and
   transmitting the second data stream from the cable headend to the second video device using the second bidirectional data channel, wherein playback of the second video is controlled by sending commands from the video device controller to the second video device for onward transmission to the first video device over the first and second bidirectional data channels.

2. The method of claim 1, wherein the digital video includes audio data, moving image data, still image data, or any combination of these.

3. The method of claim 1, wherein the digital video is encoded according to an MPEG specification.

4. The method of claim 1, wherein the first video device is a personal computer or a smartphone.

5. The method of claim 1, wherein the second video device is a television or a set top box connected to a television and the device controller is a remote control.

6. The method of claim 5, wherein the second data stream is a video stream transmitted from the headend to the second video device, and further comprising:
   decoding the video stream at the television or set top box; and
   displaying the second video on the television.

7. The method of claim 1, wherein the second data stream is a video stream transmitted from the headend to the second video device.

8. The method of claim 1, wherein forming the second data stream that includes the second video based on the digital video received in the first data stream further comprises transcoding of the received digital video into a format that is decodable by the second video device.

9. The method of claim 1, wherein the second video comprises a plurality of video frames, each video frame comprising a frame of the digital video stitched together with an interactive menu.

10. The method of claim 1, wherein the second video comprises a plurality of video frames, each video frame comprising a frame of the digital video stitched together with information associated with the first video device.

11. The method of claim 1, wherein the public data network is the Internet accessed through a cellular network.

12. The method of claim 1, wherein the first and second video devices are located within the same premises.

13. The method of claim 12, wherein no bidirectional data channel between the first and second video devices exists entirely within the premises.

14. The method of claim 1, wherein establishing the first data channel comprises:
   receiving from the first video device, a first request to establish the first bidirectional data channel, the first request having request parameters that include a unique identifier; and
   authorizing the establishment of the first bidirectional data channel based on the request parameters.

15. The method of claim 14, wherein the first request is received over either the public data network or over the cable network.

16. The method of claim 14, wherein the unique identifier is a media access control (MAC) address that is uniquely associated with the first video device.

17. The method of claim 14, wherein establishing the second bidirectional data channel comprises:
   receiving, from the second video device, a second request to establish the second bidirectional data channel, the second request having request parameters that include the unique identifier;
   identifying the first video device using the received unique identifier; and
   associating the second video device with the identified first video device.

18. The method of claim 1, wherein controlling the playback of the second video is selected from a group consisting of: establishing a video stream channel, tearing down the video stream channel, starting playback of digital video, stopping playback for the digital video, and selecting a different digital video source.

19. A tangible, non-transitory, data storage medium in which is stored computer program code for streaming digital video between a first video device and a second video device, the first video device being connected to a public data network, wherein the second video device is connected to a cable television system having a cable network and a cable headend, the cable headend also being connected to the public data network, the second video device being controlled by a video device controller, the storage medium comprising:

program code for establishing a first bidirectional data channel from the first video device to the cable headend;

program code for establishing a second bidirectional data channel over the cable network from the second video device to the cable headend, thereby permitting bidirectional data communication between the first video device and the second video device through the cable headend;

program code for receiving a first data stream that includes the digital video at the cable headend from the first video device using the first bidirectional data channel;

program code for forming a second data stream that includes a second video that is based on the digital video received in the first data stream; and program code for transmitting the second data stream from the cable headend to the second video device using the second bidirectional data channel, wherein playback of the second video is controlled by sending commands from the video device controller to the second video device for onward transmission to the first video device over the first and second bidirectional data channels.

20. The tangible, non-transitory, data storage medium of claim 19, wherein the second data stream is a video stream transmitted from the headend to the second video device.

* * * * *